(12) United States Patent
Bi et al.

(10) Patent No.: US 12,082,164 B2
(45) Date of Patent: Sep. 3, 2024

(54) METHOD FOR DETERMINING ATTRIBUTES OF SYMBOLS, NODE, AND STORAGE MEDIUM

(71) Applicant: ZTE CORPORATION, Shenzhen (CN)

(72) Inventors: Feng Bi, Shenzhen (CN); Ting Miao, Shenzhen (CN); Youxiong Lu, Shenzhen (CN); Weimin Xing, Shenzhen (CN); Wenhao Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 393 days.

(21) Appl. No.: 17/607,285

(22) PCT Filed: Apr. 27, 2020

(86) PCT No.: PCT/CN2020/087253
§ 371 (c)(1),
(2) Date: Oct. 28, 2021

(87) PCT Pub. No.: WO2020/221207
PCT Pub. Date: Nov. 5, 2020

(65) Prior Publication Data
US 2022/0191848 A1    Jun. 16, 2022

(30) Foreign Application Priority Data
Apr. 29, 2019 (CN) .......................... 201910356507.3

(51) Int. Cl.
*H04W 72/044* (2023.01)

(52) U.S. Cl.
CPC ................................ *H04W 72/044* (2013.01)

(58) Field of Classification Search
CPC ............... H04W 72/044; H04W 24/02; H04W 72/0446; H04W 72/53; H04L 5/0078; H04L 5/0092; H04L 5/0007
See application file for complete search history.

(56) References Cited

U.S. PATENT DOCUMENTS 9,345,007 B2 * 5/2016 Lee .................... H04J 13/004
10,880,914 B2 * 12/2020 Sundararajan .... H04W 72/1268
(Continued)

FOREIGN PATENT DOCUMENTS

| CN | 102469589 A | 5/2012 |
| CN | 102781089 A | 11/2012 |

(Continued)

OTHER PUBLICATIONS

Search Report for Chinese Application No. 201910356507.3, dated May 9, 2023, 4 pages including translation.
(Continued)

*Primary Examiner* — Afshawn M Towfighi
(74) *Attorney, Agent, or Firm* — Morgan, Lewis & Bockius LLP

(57) ABSTRACT

Provided are a symbol attribute determination method, a node and a storage medium. The symbol attribute determination method includes determining the attribute of a symbol by using a first mode. The attribute includes the attribute of being unavailable or the attribute of being available. The first mode is a default mode or a configured mode.

10 Claims, 8 Drawing Sheets

(56) References Cited

U.S. PATENT DOCUMENTS

| | | | |
|---|---|---|---|
| 2013/0343322 A1 | 12/2013 | Lee et al. | |
| 2015/0305025 A1* | 10/2015 | Moraru | H04W 72/0446 370/294 |
| 2019/0268923 A1* | 8/2019 | Sundararajan | H04W 72/23 |

FOREIGN PATENT DOCUMENTS

| | | |
|---|---|---|
| CN | 103181113 A | 6/2013 |
| CN | 110536317 A | 12/2019 |
| WO | WO-2016122258 A1 | 8/2016 |

OTHER PUBLICATIONS

Office Action for Chinese Application No. 201910356507.3, dated May 11, 2023, 14 pages including translation.

Extended European Search Report for Application No. 20798077.2, dated Jan. 3, 2023, 14 pages.

Japanese Office Action for Application No. 2021-564687, dated Nov. 8, 2022, 5 pages including translation.

ZTE, "Subframe structure and timing offset for UL measurement", TSG-RAN WG1 #58, R1-093203, Shenzhen, China, Aug. 14-Aug. 28, 2009, 6 pages.

Huawei, "DL transmission timing alignment for IAB", 3GPP TSG RAN WG1 Meeting #96b, R1-1903939, Xi'an, China, Apr. 8-12, 2019, 8 pages.

Huawei et al., "Resource Multiplexing Between Backhaul and Access in IAB", 3GPP TSG RAN WG1 Meeting #96bis R1-1903938, Apr. 12, 2019 (Apr. 12, 2019), entire document.

International Search Report for Application No. PCT/CN2020/087253, dated Dec. 17, 2020, 4 pages including English translation.

Request for the Submission of an Opinion in Korean Application No. 10-2021-7038931, dated Aug. 30, 2023, 8 pages including translation.

Huawei et al., R1-1812200, "On frame structure in IAB", 3GPP TSG RAN WG1 Meeting #95, Nov. 12, 2018, 6 pages.

Nokia et al., R1-1900659, "IAB Case #1 timing", 3GPP TSG RAN WG1 Ad-Hoc meeting 1901, Jan. 21, 2019, 3 pages.

\* cited by examiner

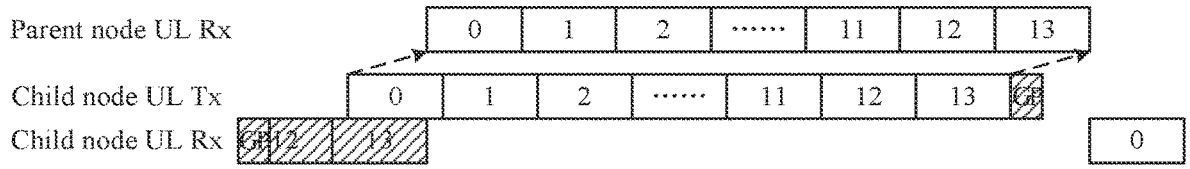

FIG. 20

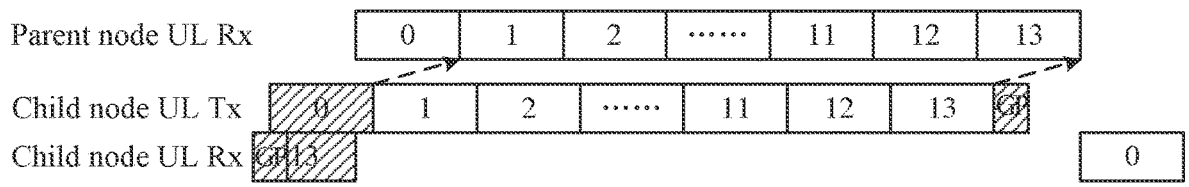

FIG. 21

| Determine the attribute of a symbol according to at least one parameter by using a first mode, where the attribute includes the attribute of being unavailable or the attribute of being available, and the first mode is a default mode or a configured mode | 21 |

FIG. 22

| Determine the attribute of a symbol by using a second mode, where the attribute includes the attribute of being unavailable or the attribute of being available | 31 |

FIG. 23

| Determine the attribute of a symbol according to at least one parameter by using a second mode, where the attribute includes the attribute of being unavailable or the attribute of being available, and the second mode is a default mode or a mode configured by a first node | 41 |

FIG. 24

METHOD FOR DETERMINING ATTRIBUTES OF SYMBOLS, NODE, AND STORAGE MEDIUM

CROSS REFERENCE TO RELATED APPLICATIONS

This application is a national stage of International Patent Application No. PCT/CN2020/087253, filed on Apr. 27, 2020, which claims priority to Chinese Patent Application No. 201910356507.3 filed with the China National Intellectual Property Administration (CNIPA) on Apr. 29, 2019, the disclosures of which are incorporated herein by reference in their entirety.

TECHNICAL FIELD

The present application relates to a wireless communication technology, for example, a symbol attribute determination method, a node and a storage medium.

BACKGROUND

With continuous progress in radio technologies, various radio services are flourishing. However, frequency spectrum resources on which the radio services are based are limited. With increasing bandwidth requirements, the frequency spectrum resources of 300 MHz to 3 GHz mainly used in traditional commercial communications are extremely strained and cannot meet requirements of the future wireless communications. In new-generation wireless communication systems (such as New Radio (NR) (also referred to as a 5G system) or a new-generation wireless communication system after 5G), a higher carrier frequency such as 28 GHz, 45 GHz or 70 GHz than that in the 4th-generation mobile communication (4G) system is adopted for communication. Such a high-frequency channel has the defects of having a larger free-propagation loss, being easily absorbed by oxygen and being greatly affected by rain attenuation, thus seriously affecting the coverage performance of a high-frequency communication system. With the introduction of relay nodes (RNs) into a communication system, the distance S between a child node and a parent node is not a unique value. For example, some child nodes are closer to their parent node while some child nodes are farther from their parent node. Additionally, nodes can move, so S is not a unique value and may change. On the other hand, a receive-transmit switching gap or a transmit-receive switching gap (hereinafter referred as to a gap) cannot counteract the factor of the distance S, so it is needed to use multiple symbols as the gap to counteract the factor of the distance S. However, in the related art, a child node and a parent node cannot learn about each other's attributes corresponding to symbols.

SUMMARY

The present application provides a symbol attribute determination method, a node and a storage medium. An embodiment of the present application provides a symbol attribute determination method.

The method includes determining the attribute of a symbol by using a first mode. The attribute includes the attribute of being unavailable or the attribute of being available. The first mode is a default mode or a configured mode.

An embodiment of the present application provides a symbol attribute determination method. The method is applied to a first node.

The method includes determining the attribute of a symbol according to at least one parameter by using a first mode. The attribute includes the attribute of being unavailable or the attribute of being available. The first mode is a default mode or a configured mode.

The at least one parameter includes at least one of a propagation delay (PD); an equivalent time difference E_offset; a receive-transmit switching gap; a symbol duration T_symbol, or a transient period.

An embodiment of the present application provides a symbol attribute determination method. The method is applied to a second node.

The method includes determining the attribute of a symbol by using a second mode. The attribute includes the attribute of being unavailable or the attribute of being available. The second mode is a default mode or a mode configured by a first node.

An embodiment of the present application provides a symbol attribute determination method. The method is applied to a second node.

The method includes determining the attribute of a symbol according to at least one parameter by using a second mode. The attribute includes the attribute of being unavailable or the attribute of being available. The second mode is a default mode or a mode configured by a first node.

The at least one parameter includes at least one of a propagation delay (PD); an equivalent time difference E_offset; a receive-transmit switching gap; a symbol duration T_symbol; or a transient period.

An embodiment of the present application provides a node. The node includes a first processing unit.

The first processing unit is configured to determine the attribute of a symbol by using a first mode. The attribute includes the attribute of being unavailable or the attribute of being available. The first mode is a default mode or a configured mode.

An embodiment of the present application provides a node. The node includes a second processing unit.

The second processing unit is configured to determine the attribute of a symbol according to at least one parameter by using a first mode. The attribute includes the attribute of being unavailable or the attribute of being available. The first mode is a default mode or a configured mode.

The at least one parameter includes at least one of a propagation delay (PD); an equivalent time difference E_offset; a receive-transmit switching gap; a symbol duration T_symbol; or a transient period.

An embodiment of the present application provides a node. The node includes a third processing unit.

The third processing unit is configured to determine the attribute of a symbol by using a second mode. The attribute includes the attribute of being unavailable or the attribute of being available. The second mode is a default mode or a mode configured by a first node.

An embodiment of the present application provides a node. The node includes a fourth processing unit.

The fourth processing unit is configured to determine the attribute of a symbol according to at least one parameter by using a second mode. The attribute includes the attribute of being unavailable or the attribute of being available. The second mode is a default mode or a mode configured by a first node.

The at least one parameter includes at least one of a propagation delay (PD); an equivalent time difference E_offset; a receive-transmit switching gap; a symbol duration T_symbol; or a transient period.

An embodiment of the present application provides a node. The node includes a processor and a memory. The memory is configured to store a computer program executable on the processor. The processor is configured to invoke and execute the computer program stored in the memory to perform the method according to any embodiment of the present application.

An embodiment of the present application provides a storage medium. The storage medium stores a computer program. When executed by a processor, the computer program causes the processor to perform the method according to any embodiment of the present application.

With the preceding implementations, the attribute of a symbol, including the attribute of being unavailable or the attribute of being available, can be determined. In this manner, by default or configuration, it is possible for both the first node and the second node to learn about attributes corresponding symbols, that is, learn which symbols are available or which symbols are unavailable.

BRIEF DESCRIPTION OF DRAWINGS

FIG. 20 is diagram eight of symbol availability for uplink transmission and uplink reception of a child node.

FIG. 21 is diagram nine of symbol availability for uplink transmission and uplink reception of a child node.

FIG. 22 is flowchart two of a symbol attribute determination method according to an embodiment of the present application.

FIG. 23 is flowchart three of a symbol attribute determination method according to an embodiment of the present application.

FIG. 24 is flowchart four of a symbol attribute determination method according to an embodiment of the present application.

DETAILED DESCRIPTION

Embodiments of the present application are described hereinafter in conjunction with the drawings.

Parameters used in the present embodiments are described below.

TA refers to the timing advance of uplink transmission of a child node relative to downlink reception of the child node.

T_offset refers to the time offset of uplink reception of a parent node relative to downlink transmission of the parent node (Time Uplink Receive to Downlink Transport (TULRx to DLTx)) or refers to the time of subtracting NTA offset from TULRx to DLTx. T_delta=T_offset/2.

E_offset refers to the equivalent time difference of downlink reception of a child node relative to downlink transmission of the child node. E_offset may be regarded as a propagation delay (PD) between a parent node and a child node.

DTT refers to downlink transmit timing (DL Tx timing).
DRT refers to downlink receive timing (DL Rx timing).
A transient period refers to a transient period of power from off to on or from on to off.
An external synchronization source refers to, for example, a global navigation satellite system (GNSS).
A slot refers to a time slot.
NCP refers to normal cyclic prefix.
ECP refers to extended cyclic prefix.

Figure 1A:
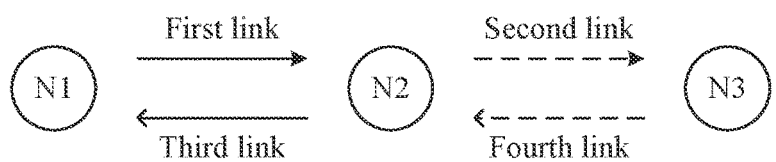
FIG. 1A is flowchart one of a symbol attribute determination method according to an embodiment of the present application.

In an example embodiment, a symbol attribute determination method is provided. The method is applied to a first node. As shown in FIG. 1A, the method includes the step below.

In step 11, the attribute of a symbol is determined by using a first mode. The attribute includes the attribute of being unavailable or the attribute of being available. The first mode is a default mode or a configured mode.

Figure 1B:
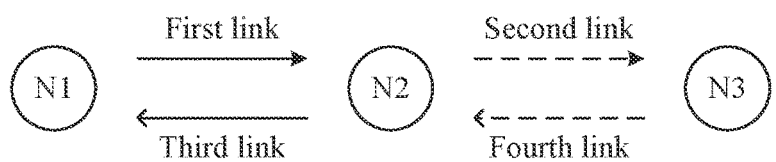
FIG. 1B is a diagram of links according to an embodiment of the present application.

Links are described here. For example, referring to FIG. 1B, N1, N2 and N3 may be understood as a first node, a second node and a third node respectively. For example, N1 is the first node and may be a base station; N2 is the second node and may be a relay station; and N3 is the third node and may be a terminal device. Here the three nodes are merely examples. N1 to N3 may correspond to other network devices and terminal devices in a communication system. These devices are not enumerated here. As can be seen from the figure, the first link is a link for data transmission from the first node to the second node, the second link is a link for data transmission from the second node to the third node, the third link is a link for data transmission from the second node to the first node, and the fourth link is a link for data transmission from the third node to the second node.

Based on the description of the preceding solution, the step in which the attribute of a symbol is determined by using a first mode may be performed by using one of the processing modes below.

Processing Mode 1

It is determined, by using the first mode, that attributes of the first i1 symbols in slot (n) of the first link and attributes of the last j1 symbols in slot (n+m) of the first link are attributes of being unavailable. n and m are each an integer greater than or equal to 0, and i1 and j1 are each an integer greater than or equal to 1.

The first i1 symbols in slot (n) may be understood as the first i1 symbols starting from the start point of slot (n). The last j1 symbols in slot (n+m) may be understood as the last j1 symbols ending at the end time of slot (n+m). That is, the reference point of the first several symbols in a slot is the start time of the slot, and the reference point of the last several symbols in a slot is the end time of the slot. This rule is used later in this embodiment to determine the first several symbols and last several symbols.

Figure 2:
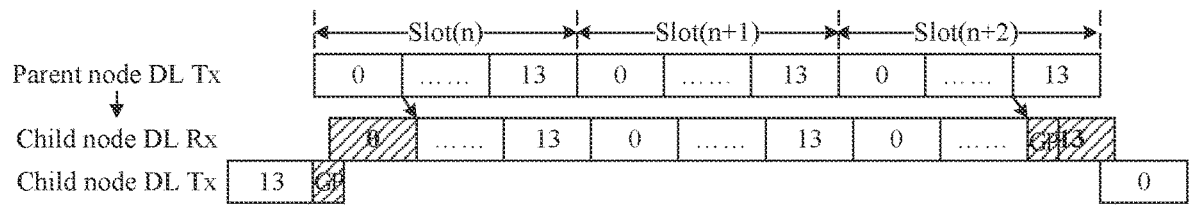
FIG. 2 is a diagram of symbol availability in a first link using Normal Cyclic Prefix (NCP) when m=2 according to an embodiment of the present application.

For example, as shown in FIG. 2, assuming that m=2, i1=1, and j1=1, then the parent node (for example, the first node in this embodiment) determines, by using the default mode or the configured mode, that the first 1 symbol in slot (n) of the first link and the last 1 symbol in slot (n)+2 of the first link are unavailable, and the child node determines, by using the default mode or the configured mode, that the first 1 symbol in slot (n) of the first link and the last 1 symbol in slot (n+2) of the first link are unavailable. As shown in FIG. 2, available symbols using the NCP in slot (n) of the first link are indexed from #1 to #13, available symbols using the NCP in slot (n+1) of the first link are indexed from #0 to #13, and available symbols using the NCP in slot (n+2) of the first link are indexed from #0 to #12.

Figure 3:
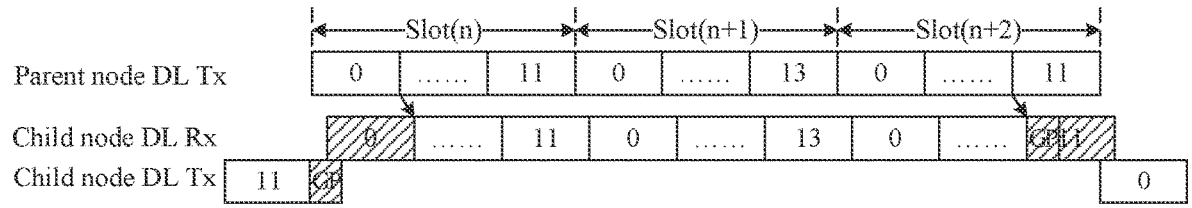
FIG. 3 is a diagram of symbol availability in a first link using Extended Cyclic Prefix (ECP) when m=2 according to an embodiment of the present application.

For another example, as shown in FIG. 3, assuming that m=2, i1=1, and j1=1, then the parent node determines, by using the default mode or the configured mode, that the first 1 symbol in slot (n) of the first link and the last 1 symbol in slot (n+2) of the first link are unavailable, and the child node determines, by using the default mode or the configured mode, that the first 1 symbol in slot (n) of the first link and the last 1 symbol in slot (n+2) of the first link are unavailable. Available symbols using the ECP in slot (n) of the first link are indexed from #1 to #11, available symbols using the ECP in slot (n+1) of the first link are indexed from #0 to #11, and available symbols using the ECP in slot (n+2) of the first link are indexed from #0 to #10.

Figure 4:
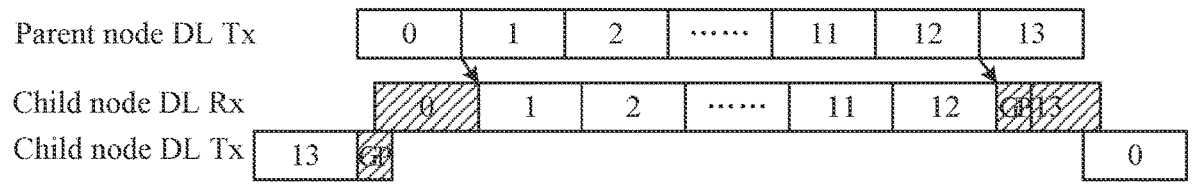
FIG. 4 is diagram one of symbol availability for downlink reception and downlink transmission of a child node.

For another example, as shown in FIG. 4, assuming that m=0, then the parent node determines, by using the default mode or the configured mode, that the first 1 symbol in slot (n) of the first link and the last 1 symbol in slot (n) of the first link are unavailable, and the child node determines, by using the default mode or the configured mode, that the first 1 symbol in slot (n) of the first link and the last 1 symbol in slot (n) of the first link are unavailable. Available symbols using the NCP in slot (n) of the first link are indexed from #1 to #12, and available symbols using the ECP in slot (n) of the first link are indexed from #1 to #10.

Processing Mode 2

It is determined, by using the first mode, that attributes of the last j2 symbols in slot (n−1) of the second link and attributes of the last j1 symbols in slot (n+m) of the first link are attributes of being unavailable. n and m are each an integer greater than or equal to 0, and j2 and j1 are each an integer greater than or equal to 1.

Figure 5:
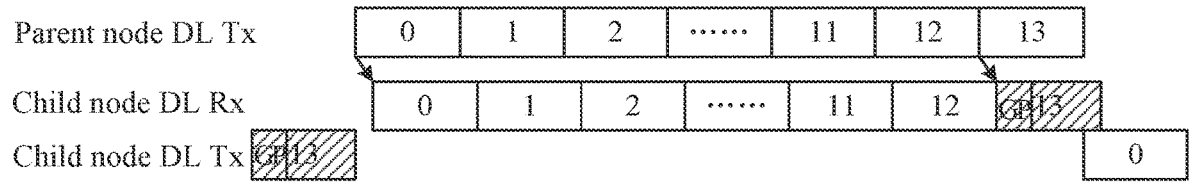
FIG. 5 is diagram two of symbol availability for downlink reception and downlink transmission of a child node.

As shown in FIG. 5, assuming that m=0, then the parent node determines, by using the default mode or the configured mode, that the last 1 symbol in slot (n−1) of the second link and the last 1 symbol in slot (n) of the first link are unavailable, and the child node determines, by using the default mode or the configured mode, that the last 1 symbol in slot (n−1) of the second link and the last 1 symbol in slot (n) of the first link are unavailable. Available symbols using the NCP in slot (n) of the first link are indexed from #0 to #12, and available symbols using the ECP in slot (n) of the first link are indexed from #0 to #10.

Processing Mode 3

It is determined, by using the first mode, that attributes of the first i1 symbols in slot (n) of the first link and attributes of the first i2 symbols in slot (n+m+1) of the second link are attributes of being unavailable. n and m are each an integer greater than or equal to 0, and i1 and i2 are each an integer greater than or equal to 1.

Figure 6:
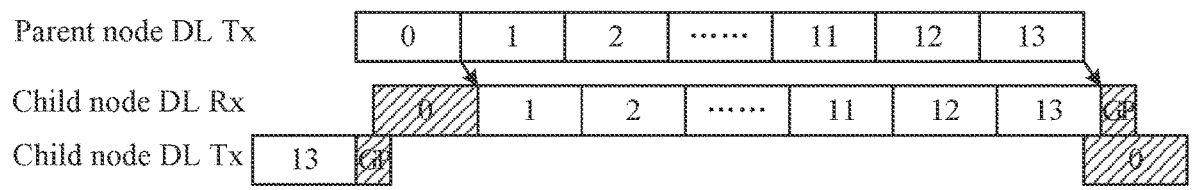
FIG. 6 is diagram three of symbol availability for downlink reception and downlink transmission of a child node.

As shown in FIG. 6, assuming that m=0, then the parent node determines, by using the default mode or the configured mode, that the first 1 symbol in slot (n) of the first link and the first 1 symbol in slot (n+1) of the second link are unavailable, and the child node determines, by using the default mode or the configured mode, that the first 1 symbol in slot (n) of the first link and the first 1 symbol in slot (n+1) of the second link are unavailable. Available symbols using the NCP in slot (n) of the first link are indexed from #1 to #13, and available symbols using the ECP in slot (n) of the first link are indexed from #1 to #11.

Processing Mode 4

It is determined, by using the first mode, that attributes of the last j2 symbols in slot (n−1) of the second link and attributes of the first i2 symbols in slot (n+m+1) of the second link are attributes of being unavailable. n and m are each an integer greater than or equal to 0, and j2 and i2 are each an integer greater than or equal to 1.

Figure 7:
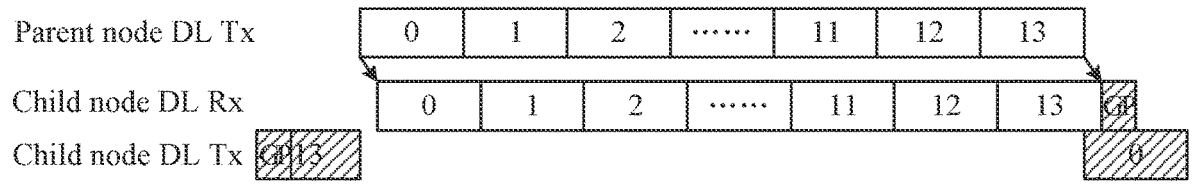
FIG. 7 is diagram four of symbol availability for downlink reception and downlink transmission of a child node.

As shown in FIG. 7, assuming that m=0, then the parent node determines, by using the default mode or the configured mode, that the last 1 symbol in slot (n−1) of the second link and the first 1 symbol in slot (n+1) of the second link are unavailable, and the child node determines, by using the default mode or the configured mode, that the last 1 symbol in slot (n−1) of the second link and the first 1 symbol in slot (n+1) of the second link are unavailable. Available symbols using the NCP in slot (n) of the first link are indexed from #0 to #13, and available symbols using the ECP in slot (n) of the first link are indexed from #0 to #11.

Processing Mode 5

It is determined, by using the first mode, that attributes of the last j1 symbols in slot (n+m) of the first link are attributes of being unavailable. n and m are each an integer greater than or equal to 0, and j1 is an integer greater than or equal to 1.

Figure 8:
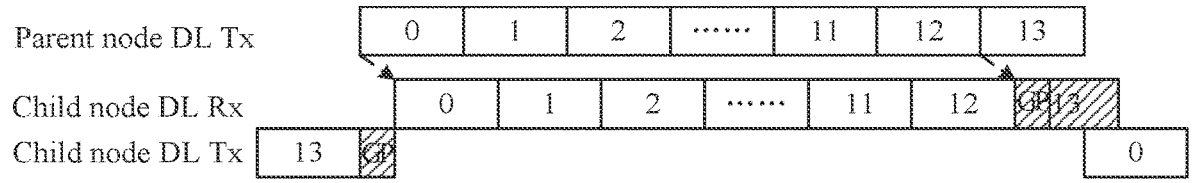
FIG. 8 is diagram five of symbol availability for downlink reception and downlink transmission of a child node.

As shown in FIG. 8, assuming that m=0, then the parent node determines, by using the default mode or the configured mode, that the last 1 symbol in slot (n) of the first link is unavailable, and the child node determines, by using the default mode or the configured mode, that the last 1 symbol in slot (n) of the first link is unavailable. Available symbols using the NCP in slot (n) of the first link are indexed from #0 to #12, and available symbols using the ECP in slot (n) of the first link are indexed from #0 to #10.

Figure 9:
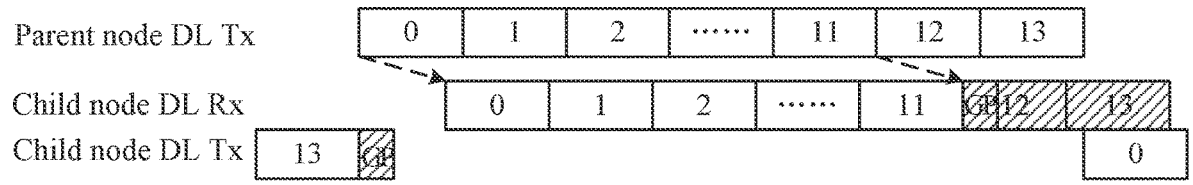
FIG. 9 is diagram six of symbol availability for downlink reception and downlink transmission of a child node.

As shown in FIG. 9, assuming that m=0, then the parent node determines, by using the default mode or the configured mode, that the last 2 symbols in slot (n) of the first link are unavailable, and the child node determines, by using the default mode or the configured mode, that the last 2 symbols in slot (n) of the first link are unavailable. Available symbols using the NCP in slot (n) of the first link are indexed from #0 to #11, and available symbols using the ECP in slot (n) of the first link are indexed from #0 to #9.

Processing Mode 6

It is determined, by using the first mode, that attributes of the first i2 symbols in slot (n+m+1) of the second link are attributes of being unavailable. n and m are each an integer greater than or equal to 0, and i2 is an integer greater than or equal to 1.

Figure 10:
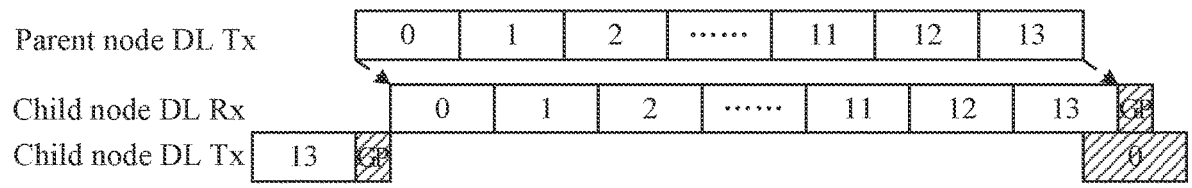
FIG. 10 is diagram seven of symbol availability for downlink reception and downlink transmission of a child node.

As shown in FIG. 10, assuming that m=0, then the parent node determines, by using the default mode or the configured mode, that the first 1 symbol in slot (n+1) of the second link is unavailable, and the child node determines, by using the default mode or the configured mode, that the first 1 symbol in slot (n+1) of the second link is unavailable. Available symbols using the NCP in slot (n) of the first link are indexed from #0 to #13, and available symbols using the ECP in slot (n) of the first link are indexed from #0 to #12.

Figure 11:
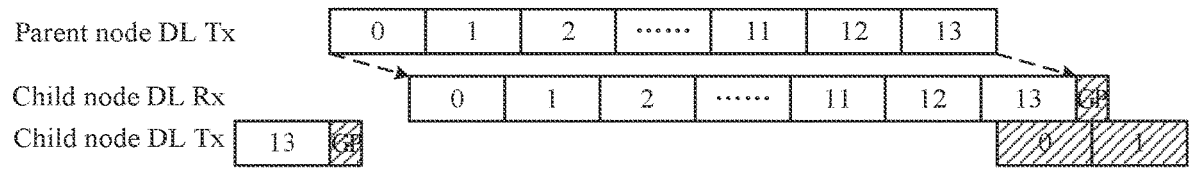
FIG. 11 is diagram eight of symbol availability for downlink reception and downlink transmission of a child node.

As shown in FIG. 11, assuming that m=0, then the parent node determines, by using the default mode or the configured mode, that the first 2 symbols in slot (n+1) of the second link are unavailable, and the child node determines, by using the default mode or the configured mode, that the first 2 symbols in slot (n+1) of the second link are unavailable. Available symbols using the NCP in slot (n) of the first link are indexed from #0 to #13, and available symbols using the ECP in slot (n) of the first link are indexed from #0 to #12.

Processing Mode 7

It is determined, by using the first mode, that attributes of the last j1 symbols in slot (n) of the first link and attributes of the first i2 symbols in slot (n+m+1) of the second link are attributes of being unavailable. n and m are each an integer greater than or equal to 0, and j1 and i2 are each an integer greater than or equal to 1.

Figure 12:
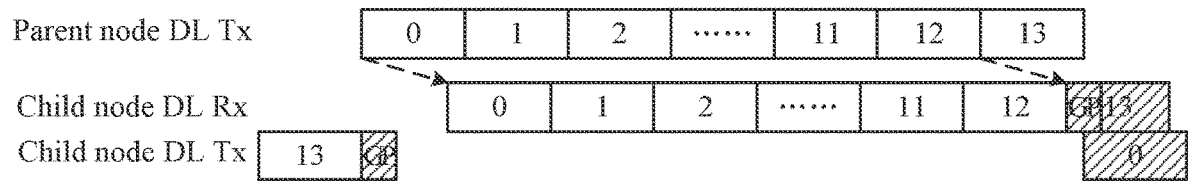
FIG. 12 is diagram nine of symbol availability for downlink reception and downlink transmission of a child node.

As shown in FIG. 12, assuming that m=0, then the parent node determines, by using the default mode or the configured mode, that the last 1 symbol in slot (n) of the first link and the first 1 symbol in slot (n+1) of the second link are unavailable, and the child node determines, by using the default mode or the configured mode, that the last 1 symbol in slot (n) of the first link and the first 1 symbol in slot (n+1) of the second link are unavailable. Available symbols using the NCP in slot (n) of the first link are indexed from #0 to #12, and available symbols using the ECP in slot (n) of the first link are indexed from #0 to #10.

Processing Mode 8

It is determined, by using the first mode, that attributes of the first i3 symbols in slot (n) of the third link and attributes of the last j3 symbols in slot (n+m) of the third link are attributes of being unavailable. n and m are each an integer greater than or equal to 0, and i3 and j3 are each an integer greater than or equal to 1.

Figure 13:
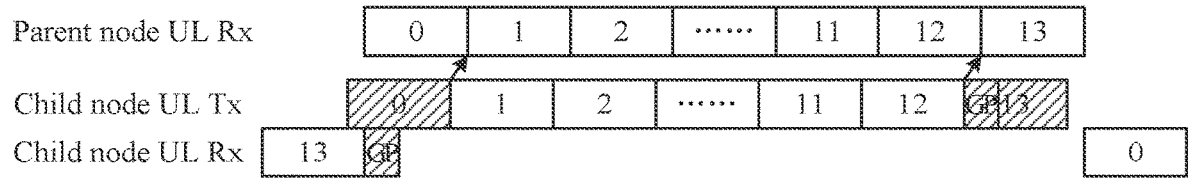
FIG. 13 is diagram one of symbol availability for uplink transmission and uplink reception of a child node.

As shown in FIG. 13, assuming that m=0, then the parent node determines, by using the default mode or the configured mode, that the first 1 symbol in slot (n) of the third link and the last 1 symbol in slot (n) of the third link are unavailable, and the child node determines, by using the default mode or the configured mode, that the first 1 symbol in slot (n) of the third link and the last 1 symbol in slot (n) of the third link are unavailable. Available symbols using the NCP in slot (n) of the third link are indexed from #1 to #12, and available symbols using the ECP in slot (n) of the third link are indexed from #1 to #10.

Processing Mode 9

It is determined, by using the first mode, that attributes of the last j4 symbols in slot (n−1) of the fourth link and attributes of the last j3 symbols in slot (n+m) of the third link are attributes of being unavailable. n and m are each an integer greater than or equal to 0, and j4 and j3 are each an integer greater than or equal to 1.

Figure 14:
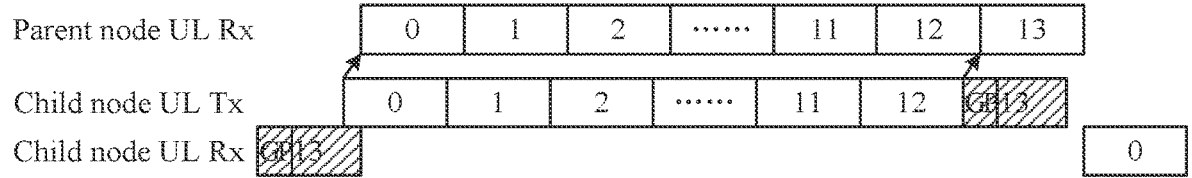
FIG. 14 is diagram two of symbol availability for uplink transmission and uplink reception of a child node.

As shown in FIG. 14, assuming that m=0, then the parent node determines, by using the default mode or the configured mode, that the last 1 symbol in slot (n−1) of the fourth link and the last 1 symbol in slot (n) of the third link are unavailable, and the child node determines, by using the default mode or the configured mode, that the last 1 symbol in slot (n−1) of the fourth link and the last 1 symbol in slot (n) of the third link are unavailable. Available symbols using the NCP in slot (n) of the third link are indexed from #0 to #12, and available symbols using the ECP in slot (n) of the third link are indexed from #0 to #10.

Processing Mode 10

It is determined, by using the first mode, that attributes of the first i3 symbols in slot (n) of the third link and attributes of the first i4 symbols in slot (n+m+1) of the fourth link are attributes of being unavailable. n and m are each an integer greater than or equal to 0, and i3 and i4 are each an integer greater than or equal to 1.

Figure 15:
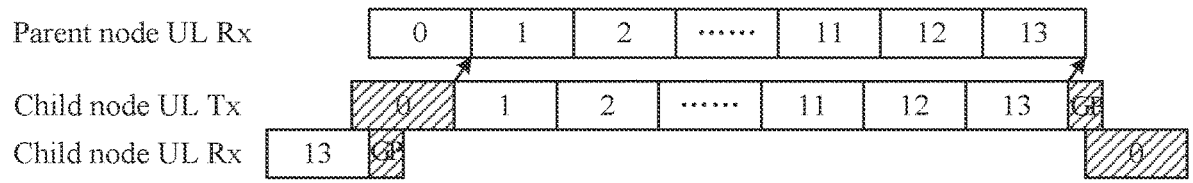
FIG. 15 is diagram three of symbol availability for uplink transmission and uplink reception of a child node.

As shown in FIG. 15, assuming that m=0, then the parent node determines, by using the default mode or the configured mode, that the first 1 symbol in slot (n) of the third link and the first 1 symbol in slot (n+1) of the fourth link are unavailable, and the child node determines, by using the default mode or the configured mode, that the first 1 symbol in slot (n) of the third link and the first 1 symbol in slot (n+1) of the fourth link are unavailable. Available symbols using the NCP in slot (n) of the third link are indexed from #1 to #13, and available symbols using the ECP in slot (n) of the third link are indexed from #1 to #11.

Processing Mode 11

It is determined, by using the first mode, that attributes of the last j4 symbols in slot (n−1) of the fourth link and attributes of the first i4 symbols in slot (n+m+1) of the fourth link are attributes of being unavailable. n and m are each an integer greater than or equal to 0, and j4 and i4 are each an integer greater than or equal to 1.

Figure 16:
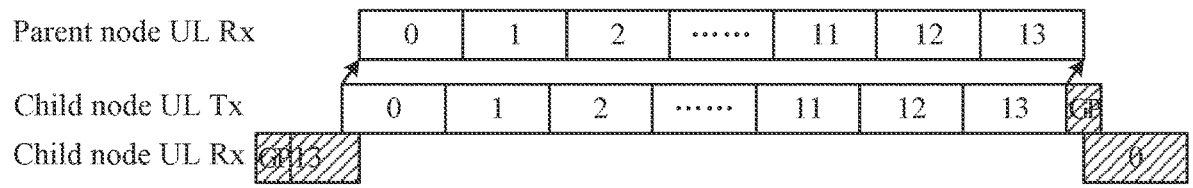
FIG. 16 is diagram four of symbol availability for uplink transmission and uplink reception of a child node.

As shown in FIG. 16, assuming that m=0, then the parent node determines, by using the default mode or the configured mode, that the last 1 symbol in slot (n−1) of the fourth link and the first 1 symbol in slot (n+1) of the fourth link are unavailable, and the child node determines, by using the default mode or the configured mode, that the last 1 symbol in slot (n−1) of the fourth link and the first 1 symbol in slot (n+1) of the fourth link are unavailable. Available symbols using the NCP in slot (n) of the third link are indexed from

0 to #13, and available symbols using the ECP in slot (n) of the third link are indexed from #0 to #11.

Processing Mode 12

It is determined, by using the first mode, that attributes of the first i3 symbols in slot (n) of the third link are attributes of being unavailable. n is an integer greater than or equal to 0, and i3 is an integer greater than or equal to 1.

Figure 17:
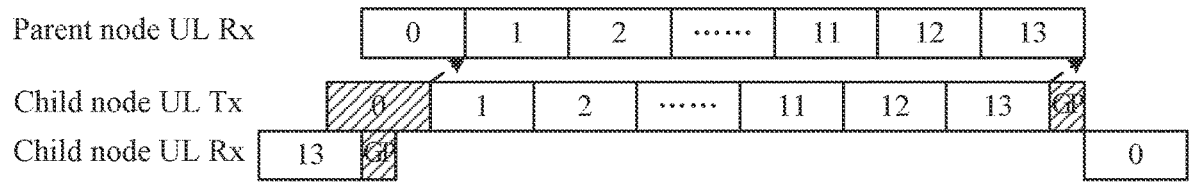
FIG. 17 is diagram five of symbol availability for uplink transmission and uplink reception of a child node.

As shown in FIG. 17, the parent node determines, by using the default mode or the configured mode, that the first 1 symbol in slot (n) of the third link is unavailable, and the child node determines, by using the default mode or the configured mode, that the first 1 symbol in slot (n) of the third link is unavailable. Available symbols using the NCP in slot (n) of the third link are indexed from #1 to #13, and available symbols using the ECP in slot (n) of the third link are indexed from #1 to #11.

Figure 18:
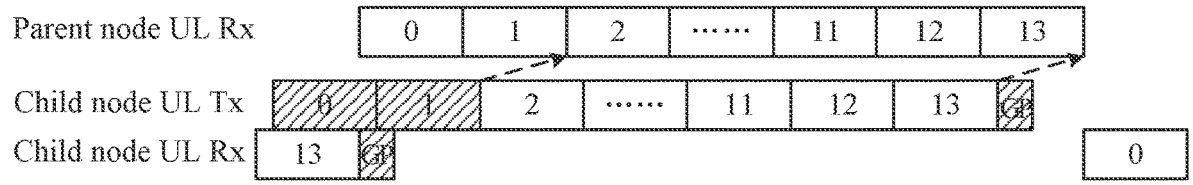
FIG. 18 is diagram six of symbol availability for uplink transmission and uplink reception of a child node.

As shown in FIG. 18, assuming that m=0, then the parent node determines, by using the default mode or the configured mode, that the first 2 symbols in slot (n) of the third link are unavailable, and the child node determines, by using the default mode or the configured mode, that the first 2 symbols in slot (n) of the third link are unavailable. Available symbols using the NCP in slot (n) of the third link are indexed from #2 to #13, and available symbols using the ECP in slot (n) of the third link are indexed from #2 to #11.

Processing Mode 13

It is determined, by using the first mode, that attributes of the last j4 symbols in slot (n−1) of the fourth link are attributes of being unavailable. n is an integer greater than or equal to 0, and j4 is an integer greater than or equal to 1.

Figure 19:
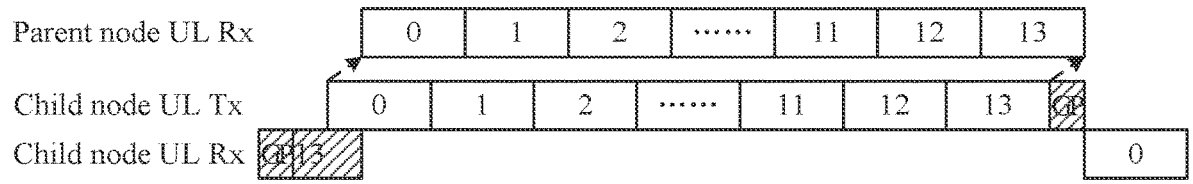
FIG. 19 is diagram seven of symbol availability for uplink transmission and uplink reception of a child node.

As shown in FIG. 19, the parent node determines, by using the default mode or the configured mode, that the last 1 symbol in slot (n−1) of the fourth link is unavailable, and the child node determines, by using the default mode or the configured mode, that the last 1 symbol in slot (n−1) of the fourth link is unavailable. Available symbols using the NCP in slot (n) of the fourth link are indexed from #0 to #13, and available symbols using the ECP in slot (n) of the fourth link are indexed from #0 to #12.

For another example, as shown in FIG. 20, assuming that m=0, then the parent node determines, by using the default mode or the configured mode, that the last 2 symbols in slot (n−1) of the fourth link are unavailable, and the child node determines, by using the default mode or the configured mode, that the last 2 symbols in slot (n−1) of the fourth link are unavailable. Available symbols using the NCP in slot (n) of the third link are indexed from #0 to #13, and available symbols using the ECP in slot (n) of the third link are indexed from #0 to #12.

Processing Mode 14

It is determined, by using the first mode, that attributes of the first i3 symbols in slot (n) of the third link and attributes of the last j4 symbols in slot (n−1) of the fourth link are attributes of being unavailable. n is an integer greater than or equal to 0, and i3 and j4 are each an integer greater than or equal to 1.

As shown in FIG. 21, assuming that m=0, then the parent node determines, by using the default mode or the configured mode, that the first 1 symbol in slot (n) of the third link and the last 1 symbol in slot (n−1) of the fourth link are unavailable, and the child node determines, by using the default mode or the configured mode, that the first 1 symbol in slot (n) of the third link and the last 1 symbol in slot (n−1) of the fourth link are unavailable. Available symbols using the NCP in slot (n) of the third link are indexed from #1 to #13, and available symbols using the ECP in slot (n) of the third link are indexed from #1 to #11. The default mode may be a mode specified in a protocol or may be understood as a mode determined by negotiation between the first node and the second node.

In this embodiment, it is also feasible to determine the attribute of a symbol by configuring, by the first node, the attribute of the symbol onto the second node. In this manner, both the first node and the second node can perform processing based on the determined attribute of the symbol.

As described in Table 1, the first node determines an unavailable symbol according to the content of the row corresponding to a default index (for example, index=0). The default index of the second node is the same as the default index (for example, index=0) of the first node. The second node determines an unavailable symbol according to the content of the row corresponding to the default index. The preferred value of j1 and the preferred value of i2 are each less than or equal to 30 symbols.

As described in Table 2, the first node determines an unavailable symbol according to the content of the row corresponding to a default index (for example, index=0). The default index of the second node is the same as the default index (for example, index=0) of the first node. The second node determines an unavailable symbol according to the content of the row corresponding to the default index. The preferred value of i3 and the preferred value of j4 are each less than or equal to 30 symbols.

TABLE 1

| Index | Slot (n − 1) of the Second Link | Slot (n) of the First Link | Slot (n + m) of the First Link | Slot (n + m + 1) of the Second Link |
|---|---|---|---|---|
| 0 |  | First 1 | Last 1 |  |
| 1 | Last 1 |  | Last 1 |  |
| 2 |  | First 1 |  | First 1 |
| 3 | Last 1 |  |  | First 1 |
| 4 |  |  | Last 1 |  |
| 5 |  |  |  | First 1 |
| 6 |  |  | Last 2 |  |
| 7 |  |  | Last 1 | First 1 |
| 8 |  |  |  | First 2 |
| 9 |  |  | Last 3 |  |
| 10 |  |  | Last 2 | First 1 |
| 11 |  |  | Last 1 | First 2 |
| 12 |  |  |  | First 3 |
| . . . |  |  | . . . | . . . |
| . . . |  |  | Last j1 |  |
| . . . |  |  | . . . | . . . |
| Index_x |  |  |  | First i2 |

TABLE 2

| Index | Slot (n − 1) of the Fourth Link | Slot (n) of the Third Link | Slot (n + m) of the Third Link | Slot (n + m + 1) of the Fourth Link |
|---|---|---|---|---|
| 0 |  | First 1 | Last 1 |  |
| 1 | Last 1 |  | Last 1 |  |
| 2 |  | First 1 |  | First 1 |
| 3 | Last 1 |  |  | First 1 |
| 4 |  | First 1 |  |  |
| 5 | Last 1 |  |  |  |
| 6 |  | First 2 |  |  |
| 7 | Last 1 | First 1 |  |  |
| 8 | Last 2 |  |  |  |
| 9 |  | First 3 |  |  |
| 10 | Last 1 | First 2 |  |  |
| 11 | Last 2 | First 1 |  |  |
| 12 | Last 3 |  |  |  |
| . . . | . . . | . . . |  |  |
| . . . |  | First i3 |  |  |
| . . . | . . . | . . . |  |  |
| Index_y | Last j4 |  |  |  |

Alternatively, as described in Table 1, the first node configures an index according to $\lceil \log_2(x) \rceil$ binary bits and determines an unavailable symbol according to the content of the row corresponding to the index, and the second node is configured with the $\lceil \log_2(x) \rceil$ binary bits, determines a corresponding index according to a binary bit state and determines an unavailable symbol according to the content of the row corresponding to the index. x indicates the maximum index, $\lceil \ \rceil$ indicates rounding up.

Alternatively, as described in Table 2, the first node configures an index according to $\lceil \log_2(y) \rceil$ binary bits and determines an unavailable symbol according to the content of the row corresponding to the index, and the second node is configured with the $\lceil \log_2(y) \rceil$ binary bits, determines a corresponding index according to a binary bit state and determines an unavailable symbol according to the content of the row corresponding to the index. y indicates the maximum index. $\lceil \ \rceil$ indicates rounding up.

As described in Table 1 and Table 2, the two tables are combined into one table, the first node configures an index according to $\lceil \log_2(x+y) \rceil$ binary bits and determines an unavailable symbol according to the content of the row corresponding to the index, and the second node is configured with the $\lceil \log_2(x+y) \rceil$ binary bits, determines a corresponding index according to a binary bit state and determines an unavailable symbol according to the content of the row corresponding to the index. x+y indicates the maximum index. $\lceil \ \rceil$ indicates rounding up.

Another mode is described below.

The first node configures the first i1 symbols in slot (n) of the first link to be unavailable by using $\lceil \log_2(i1) \rceil$ binary bits. The first node configures the last j1 symbols in slot (n+m) of the first link to be unavailable by using $\lceil \log_2(j1) \rceil$ binary bits. The first node configures the first i2 symbols in slot (n+m+1) of the second link to be unavailable by using $\lceil \log_2(i2) \rceil$ binary bits. The first node configures the last j2 symbols in slot (n−1) of the second link to be unavailable by using $\lceil \log_2(j2) \rceil$ binary bits. The first node configures the first i3 symbols in slot (n) of the third link to be unavailable by using $\lceil \log_2(i3) \rceil$ binary bits. The first node configures the last j3 symbols in slot (n+m) of the third link to be unavailable by using $\lceil \log_2(j3) \rceil$ binary bits. The first node configures the first i4 symbols in slot (n+m+1) of the fourth link to be unavailable by using $\lceil \log_2(i4) \rceil$ binary bits. The first node configures the last j4 symbols in slat (n−1) of the fourth link to be unavailable by using $\lceil \log_2(j4) \rceil$ binary bits. The second node is configured with the $\lceil \log_2(i1) \rceil$ binary bits and determines that the first i1 symbols in slot (n) of the first link are unavailable based on the binary bit state. The second node is configured with the $\lceil \log_2(j1) \rceil$ binary bits and determines that the last j1 symbols in slot (n+m) of the first link are unavailable based on the binary bit state. The second node is configured with the $\lceil \log_2(i2) \rceil$ binary bits and determines that the first i2 symbols in slot (n+m+1) of the second link are unavailable based on the binary bit state. The second node is configured with the $\lceil \log_2(j2) \rceil$ binary bits and determines that the last j2 symbols in slot (n−1) of the second link are unavailable based on the binary bit state. The second node is configured with $\lceil \log_2(i3) \rceil$ binary bits and determines that the first i3 symbols in slot (n) of the third link are unavailable based on the binary bit state. The second node is configured with the $\lceil \log_2(j3) \rceil$ binary bits and determines that the last j3 symbols in slot (n+m) of the third link are unavailable based on the binary bit state. The second node is configured with the $\lceil \log_2(i4) \rceil$ binary bits and determines that the first i4 symbols in slot (n+m+1) of the fourth link are unavailable based on the binary bit state. The second node is configured with the $\lceil \log_2(j4) \rceil$ binary bits and determines that the last j4 symbols in slot (n−1) of the fourth link are unavailable based on the binary bit state. The preferred values of i1, j1, i2, j2, i3, j3, i4 and j4 symbols are each less than or equal to 30 symbols (the symbols are the symbol durations corresponding to subcarrier spacing (SCS)_ref=15 kHz), and the preferred values of the corresponding binary bits are each less than or equal to 5 bits.

For example, in the case where SCS=2μ*SCS_ref and μ is an integer greater than or equal to 0, the preferred values of i1, j1, i2, j2, i3, j3, i4 and j4 symbols are each less than or equal to 30 symbols (the symbols are the symbol durations corresponding to SCS=2μ*SCS_ref), and the preferred values of the corresponding binary bits are each less than or equal to 5 bits. Alternatively, in the case where SCS=2μ*SCS_ref and μ is an integer greater than or equal to 0, the preferred values of i1, j1, i2, j2, i3, j3, i4 and j4 are each less than or equal to 2μ*30 symbols (the symbols are the symbol durations corresponding to SCS=2μ*SCS_ref), and the preferred values of the corresponding binary bits are each less than or equal to (μ+5) bits.

In this embodiment, based on the preceding solution, the method may further include using the symbol as a gap in the case where the symbol has the attribute of being unavailable.

The method further includes extending, based on a subcarrier spacing, the symbol having the attribute of being unavailable, where the subcarrier spacing is obtained by multiplying, by k, a subcarrier spacing corresponding to the symbol having the attribute of being unavailable. x symbols in the symbols obtained by the extension have attributes of being unavailable, and k−x symbols in the symbols obtained by the extension have attributes of being available. k is an integer greater than 1, and x is an integer greater than or equal to 1.

The extending may be understood as shortening the duration of a symbol by 1/k and increasing the number of symbols by k times the original symbol duration. For example, the duration of one symbol corresponding to SCS_ref=15 kHz is T_symbol_ref, and after extension by two times, SCS=30 kHz, two symbols are obtained, and the duration of one symbol is T_symbol=T_symbol_ref/2. That is, after the extention, the duration of one symbol is 1/k of the original, and the number of symbols is k times the original.

Additionally, the method further includes rounding a time offset T_offset or T_delta according to a symbol boundary or a slot boundary in the case where uplink receive timing of the first node and uplink receive timing of the second node are not aligned with each other. Whether rounding up or rounding down is used may be selected depending on the actual situation. The details are not listed here.

The method further includes determining, based on a symbol having the attribute of being unavailable within a preset duration, start and end points of a symbol having the attribute of being available and the range of the symbol having the attribute of being available. That is, symbols other than symbols having the attribute of being unavailable within a preset duration are available symbols. That is, the start position and the end position of the available symbols can be determined based on the unavailable symbols. In this manner, the range of the symbols having the attribute of being available can be determined based on the start position and the end position.

In an example embodiment, a symbol attribute determination method is provided. The method is applied to a first node. As shown in FIG. 22, the method includes the step below.

In step 21, the attribute of a symbol is determined according to at least one parameter by using a first mode. The attribute includes the attribute of being unavailable or the attribute of being available. The first mode is a default mode or a configured mode.

The at least one parameter includes at least one of a propagation delay (PD); an equivalent time difference E_offset; a receive-transmit switching gap; a symbol duration T_symbol; or a transient period.

In this embodiment, definitions of the default mode, configured mode and links are the same as those described in the previous embodiment and thus are not repeated here.

In this embodiment, the step in which the attribute of a symbol is determined according to at least one parameter by using a first mode may be performed by using one of the processing modes below.

Processing Mode 1

In the case where the PD is less than the gap, it is determined, by using the first mode, that attributes of the first i1 symbols in slot (n) of the first link and attributes of the last j1 symbols in slot (n+m) of the first link are attributes of being unavailable. n and m are each an integer greater than or equal to 0, and i1 and j1 are each an integer greater than or equal to 1.

As shown in FIG. 2, assuming that m=2, then in the case where PD<gap, or in the case where PD<(gap+transient period), or in the case where E_offset<gap or in the case where E_offset<(gap+transient period), the parent node determines, by using the default mode or the configured mode, that the first 1 symbol in slot (n) of the first link and the last 1 symbol in slot (n+2) of the first link are unavailable, and the child node determines, by using the default mode or the configured mode, that the first 1 symbol in slot (n) of the first link and the last 1 symbol in slot (n+2) of the first link are unavailable. Available symbols using the NCP in slot (n) of the first link are indexed from #1 to #13, available symbols using the NCP in slot (n+1) of the first link are indexed from #0 to #13, and available symbols using the NCP in slot (n+2) of the first link are indexed from #0 to #12.

As shown in FIG. 3, assuming that m=2, then in the case where PD<gap, or in the case where PD<(gap+transient period), or in the case where E_offset<gap, or in the case where E_offset<(gap+transient period), the parent node determines, by using the default mode or the configured mode, that the first 1 symbol in slot (n) of the first link and the last 1 symbol in slot (n+2) of the first link are unavailable, and the child node determines, by using the default mode or the configured mode, that the first 1 symbol in slot (n) of the first link and the last 1 symbol in slot (n+2) of the first link are unavailable. Available symbols using the ECP in slot (n) of the first link are indexed from #1 to #11, available symbols using the ECP in slot (n+1) of the first link are indexed from #0 to #11, and available symbols using the ECP in slot (n+2) of the first link are indexed from #0 to #10.

As shown in FIG. 4, assuming that m=0, then in the case where PD<gap, or in the case where PD<(gap+transient period), or in the case where E_offset<gap, or in the case where E_offset<(gap+transient period), the parent node determines, by using the default mode or the configured mode, that the first 1 symbol in slot (n) of the first link and the last 1 symbol in slot (n) of the first link are unavailable, and the child node determines, by using the default mode or the configured mode, that the first 1 symbol in slot (n) of the first link and the last 1 symbol in slot (n) of the first link are unavailable. Available symbols using the NCP in slot (n) of the first link are indexed from #1 to #12, and available symbols using the ECP in slot (n) of the first link are indexed from #1 to #10.

Processing Mode 2

In the case where the PD is less than the gap, it is determined, by using the first mode, that attributes of the last j2 symbols in slot (n−1) of the second link and attributes of the last j1 symbols in slot (n+m) of the first link are attributes of being unavailable. n and m are each an integer greater than or equal to 0, and j2 and j1 are each an integer greater than or equal to 1.

As shown in FIG. 5, assuming that m=0, then in the case where PD<gap, or in the case where PD<(gap+transient period), or in the case where E_offset<gap, or in the case where E_offset<(gap+transient period), the parent node determines, by using the default mode or the configured mode, that the last 1 symbol in slot (n−1) of the second link and the last 1 symbol in slot (n) of the first link are unavailable, and the child node determines, by using the default mode or the configured mode, that the last 1 symbol in slot (n−1) of the second link and the last 1 symbol in slot (n) of the first link are unavailable. Available symbols using the NCP in slot (n) of the first link are indexed from #0 to #12, and available symbols using the ECP in slot (n) of the first link are indexed from #0 to #10.

Processing Mode 3

In the case where the PD is less than the gap, it is determined, by using the first mode, that attributes of the first i1 symbols in slot (n) of the first link and attributes of the first i2 symbols in slot (n+m+1) of the second link are attributes of being unavailable. n and m are each an integer greater than or equal to 0, and i1 and i2 are each an integer greater than or equal to 1.

As shown in FIG. 6, assuming that m=0, then in the case where PD<gap, or in the case where PD<(gap+transient period), or in the case where E_offset<gap, or in the case where E_offset<(gap+transient period), the parent node determines, by using the default mode or the configured mode, that the first 1 symbol in slot (n) of the first link and the first 1 symbol in slot (n+1) of the second link are unavailable, and the child node determines, by using the default mode or the configured mode, that the first 1 symbol in slot (n) of the first link and the first 1 symbol in slot (n+1) of the second link are unavailable. Available symbols using the NCP in slot (n) of the first link are indexed from #1 to #13, and available symbols using the ECP in slot (n) of the first link are indexed from #1 to #11.

Processing Mode 4

In the case where the PD is less than the gap, it is determined, by using the first mode, that attributes of the last j2 symbols in slot (n−1) of the second link and attributes of the first i2 symbols in slot (n+m+1) of the second link are attributes of being unavailable. n and m are each an integer greater than or equal to 0, and j2 and i2 are each an integer greater than or equal to 1.

As shown in FIG. 7, assuming that m=0, then in the case where PD<gap, or in the case where PD<(gap+transient period), or in the case where E_offset<gap, or in the case where E_offset<(gap+transient period), the parent node determines, by using the default mode or the configured mode, that the last 1 symbol in slot (n−1) of the second link and the first 1 symbol in slot (n+1) of the second link are unavailable, and the child node determines, by using the default mode or the configured mode, that the last 1 symbol in slot (n−1) of the second link and the first 1 symbol in slot (n+1) of the second link are unavailable. Available symbols using the NCP in slot (n) of the first link are indexed from

0 to #13, and available symbols using the ECP in slot n of the first link are indexed from #0 to #11.

Processing Mode 5

In the case where the PD is greater than the gap and less than the difference obtained by subtracting the gap from the T_symbol, it is determined, by using the first mode, that attributes of the last j1 symbols in slot (n+m) of the first link are attributes of being unavailable. n and m are each an integer greater than or equal to 0, and j1 is an integer greater than or equal to 1.

As shown in FIG. 8, assuming that m=0, then in the case where gap≤PD≤(T_symbol−gap), or in the case where (gap+transient period)≤PD≤(T_symbol−gap−transient period), in the case where gap≤E_offset≤(T_symbol−gap), or in the case where (gap+transient period)≤E_offset≤(T_symbol−gap−transient period), the parent node determines, by using the default mode or the configured mode, that the last 1 symbol in slot (n) of the first link is unavailable, and the child node determines, by using the default mode or the configured mode, that the last 1 symbol in slot (n) of the first link is unavailable. Available symbols using the NCP in slot (n) of the first link are indexed from #0 to #12, and available symbols using the ECP in slot (n) of the first link are indexed from #0 to #10.

Processing Mode 6

In the case where the PD is greater than the gap and less than the difference obtained by subtracting the gap from the T_symbol, it is determined, by using the first mode, that attributes of the first i2 symbols in slot (n+m+1) of the second link are attributes of being unavailable. n and m are each an integer greater than or equal to 0, and i2 is an integer greater than or equal to 1.

As shown in FIG. 10, assuming that m=0, then in the case where gap≤PD≤(T_symbol−gap), or in the case where (gap+transient period)≤PD≤(T_symbol−gap−transient period), or in the case where gap≤E_offset≤(T_symbol−gap), or in the case where (gap+transient period)≤E_offset≤(T_symbol−gap−transient period), the parent node determines, by using the default mode or the configured mode, that the first 1 symbol in slot (n+1) of the second link is unavailable, and the child node determines, by using the default mode or the configured mode, that the first 1 symbol in slot (n+1) of the second link is unavailable. Available symbols using the NCP in slot (n) of the first link are indexed from #0 to #13, and available symbols using the ECP in slot (n) of the first link are indexed from #0 to #11.

Processing Mode 7

In the case where the PD is greater than the difference obtained by subtracting the gap from the T_symbol, it is determined, by using the first mode, that attributes of the last j1 symbols in slot (n+m) of the first link are attributes of being unavailable. n and m are each an integer greater than or equal to 0, and j1 is an integer greater than or equal to 1.

As shown in FIG. 9, assuming that m=0, then in the case where (T_symbol−gap)<PD<T_symbol, or in the case where (T_symbol−gap−transient period)<PD<T_symbol, or in the case where (T_symbol−gap)<E_offset<T_symbol, or in the case where (T_symbol−gap−transient period)<E_offset<T_symbol, the parent node determines, by using the default mode or the configured mode, that the last 2 symbols in slot (n) of the first link are unavailable, and the child node determines, by using the default mode or the configured mode, that the last 2 symbols in slot (n) of the first link are unavailable. Available symbols using the NCP in slot (n) of the first link are indexed from #0 to #11, and available symbols using the ECP in slot (n) of the first link are indexed from #0 to #9.

Processing Mode 8

In the case where the PD is greater than the difference obtained by subtracting the gap from the T_symbol, it is determined, by using the first mode, that attributes of the first i2 symbols in slot (n+m+1) of the second link are attributes of being unavailable. n and m are each an integer greater than or equal to 0, and i2 is an integer greater than or equal to 1.

As shown in FIG. 11, assuming that m=0, then in the case where (T_symbol−gap)<PD<T_symbol, or in the case where (T_symbol−gap−transient period)<PD<T_symbol, or in the case where (T_symbol−gap)<E_offset<T_symbol, or in the case where (T_symbol−gap−transient period)<E_offset<T_symbol, the parent node determines, by using the default mode or the configured mode, that the first 2 symbols in slot (n+1) of the second link are unavailable, and the child node determines, by using the default mode or the configured mode, that the first 2 symbols in slot (n+1) of the second link are unavailable. Available symbols using the NCP in slot (n) of the first link are indexed from #0 to #13, and available symbols using the ECP in slot (n) of the first link are indexed from #0 to #11.

Processing Mode 9

In the case where the PD is greater than the difference obtained by subtracting the gap from the T_symbol, it is determined, by using the first mode, that attributes of the last j1 symbols in slot (n) of the first link and attributes of the first i2 symbols in slot (n+m+1) of the second link are attributes of being unavailable. n and m are each an integer greater than or equal to 0, and j1 and i2 are each an integer greater than or equal to 1.

As shown in FIG. 12, assuming that m=0, then in the case where (T_symbol−gap)<PD<<T_symbol, or in the case where (T_symbol−gap−transient period)<PD<T_symbol, or in the case where (T_symbol−gap)<E_offset<T_symbol, or in the case where (T_symbol−gap−transient period)<E_offset<T_symbol, the parent node determines, by using the default mode or the configured mode, that the last 1 symbol in slot (n) of the first link and the first 1 symbol in slot (n+1) of the second link are unavailable, and the child node determines, by using the default mode or the configured mode, that the last 1 symbol in slot (n) of the first link and the first 1 symbol in slot (n+1) of the second link are unavailable. Available symbols using the NCP in slot (n) of the first link are indexed from #0 to #12, and available symbols using the ECP in slot (n) of the first link are indexed from #0 to #10.

Processing Mode 10

In the case where the PD is less than the gap, it is determined, by using the first mode, that attributes of the first i3 symbols in slot (n) of the third link and attributes of the last j3 symbols in slot (n+m) of the third link are attributes of being unavailable. n and m are each an integer greater than or equal to 0, and i3 and j3 are each an integer greater than or equal to 1.

As shown in FIG. 13, assuming that m=0, then in the case where PD<gap, in the case where PD<(gap+transient period), or in the case where E_offset<gap, or in the case where E_offset<(gap+transient period), the parent node determines, by using the default mode or the configured mode, that the first 1 symbol in slot (n) of the third link and the last 1 symbol in slot (n) of the third link are unavailable, and the child node determines, by using the default mode or the configured mode, that the first 1 symbol in slot (n) of the third link and the last 1 symbol in slot (n) of the third link are unavailable. Available symbols using the NCP in slot (n)

of the third link are indexed from #1 to #12, and available symbols using the ECP in slot (n) of the third link are indexed from #1 to #10.

Processing Mode 11

In the case where the PD is less than the gap, it is determined, by using the first mode, that attributes of the last j4 symbols in slot (n−1) of the fourth link and attributes of the last j3 symbols in slot (n+m) of the third link are attributes of being unavailable. n and m are each an integer greater than or equal to 0, and j4 and j3 are each an integer greater than or equal to 1.

As shown in FIG. 14, assuming that m=0, then in the case where PD<gap, in the case where PD<(gap+transient period), or in the case where E_offset<gap, or in the case where E_offset<(gap+transient period), the parent node determines, by using the default mode or the configured mode, that the last 1 symbol in slot (n−1) of the fourth link and the last 1 symbol in slot (n) of the third link are unavailable, and the child node determines, by using the default mode or the configured mode, that the last 1 symbol in slot (n−1) of the fourth link and the last 1 symbol in slot (n) of the third link are unavailable. Available symbols using the NCP in slot (n) of the third link are indexed from #0 to #12, and available symbols using the ECP in slot (n) of the third link are indexed from #0 to #10.

Processing Mode 12

In the case where the PD is less than the gap, it is determined, by using the first mode, that attributes of the first i3 symbols in slot (n) of the third link and attributes of the first i4 symbols in slot (n+m+1) of the fourth link are attributes of being unavailable. n and m are each an integer greater than or equal to 0, and i3 and i4 are each an integer greater than or equal to 1.

As shown in FIG. 15, assuming that m=0, then in the case where PD<gap, or in the case where PD<(gap+transient period), or in the case where E_offset<gap, or in the case where E_offset<(gap+transient period), the parent node determines, by using the default mode or the configured mode, that the first 1 symbol in slot (n) of the third link and the first 1 symbol in slot (n+1) of the fourth link are unavailable, and the child node determines, by using the default mode or the configured mode, that the first 1 symbol in slot (n) of the third link and the first 1 symbol in slot (n+1) of the fourth link are unavailable. Available symbols using the NCP in slot (n) of the third link are indexed from #1 to #13, and available symbols using the ECP in slot (n) of the third link are indexed from #1 to #11.

Processing Mode 13

In the case where the PD is less than the gap, it is determined, by using the first mode, that attributes of the last j4 symbols in slot (n−1) of the fourth link and attributes of the first i4 symbols in slot (n+m+1) of the fourth link are attributes of being unavailable. n and m are each an integer greater than or equal to 0, and j4 and i4 are each an integer greater than or equal to 1.

As shown in FIG. 16, in the case where PD<gap, in the case where E_offset<gap, or in the case where E_offset<(gap+transient period), the parent node determines, by using the default mode or the configured mode, that the last 1 symbol in slot (n−1) of the fourth link and the first 1 symbol in slot (n+1) of the fourth link are unavailable, and the child node determines, by using the default mode or the configured mode, that the last 1 symbol in slot (n−1) of the fourth link and the first 1 symbol in slot (n+1) of the fourth link are unavailable. Available symbols using the NCP in slot (n) of the third link are indexed from #0 to #13, and available symbols using the ECP in slot (n) of the third link are indexed from #0 to #11.

Processing Mode 14

In the case where the PD is greater than the gap and less than the difference obtained by subtracting the gap from the T_symbol, it is determined, by using the first mode, that attributes of the first i3 symbols in slot (n) of the third link are attributes of being unavailable. n is an integer greater than or equal to 0, and i3 is an integer greater than or equal to 1.

As shown in FIG. 17, assuming that m=0, then in the case where gap≤PD≤(T_symbol−gap), or in the case where (gap+transient period)≤PD≤(T_symbol−gap−transient period), or in the case where gap≤E_offset≤(T_symbol−gap), or in the case where (gap+transient period)≤E_offset≤(T_symbol−gap−transient period), the parent node determines, by using the default mode or the configured mode, that the first 1 symbol in slot (n) of the third link is unavailable, and the child node determines, by using the default mode or the configured mode, that the first 1 symbol in slot (n) of the third link is unavailable. Available symbols using the NCP in slot (n) of the third link are indexed from #1 to #13, and available symbols using the ECP in slot (n) of the third link are indexed from #1 to #11.

Processing Mode 15

In the case where the PD is greater than the gap and less than the difference obtained by subtracting the gap from the T_symbol, it is determined, by using the first mode, that attributes of the last j4 symbols in slot (n−1) of the fourth link are attributes of being unavailable. n is an integer greater than or equal to 0, and j4 is an integer greater than or equal to 1.

As shown in FIG. 19, assuming that m=0, then in the case where gap≤PD≤(T_symbol−gap), or in the case where (gap+transient period)≤PD≤(T_symbol−gap−transient period), or in the case where gap≤E_offset≤(T_symbol−gap), or in the case where (gap+transient period)≤E_offset≤(T_symbol−gap−transient period), the parent node determines, by using the default mode or the configured mode, that the last 1 symbol in slot (n−1) of the fourth link is unavailable, and the child node determines, by using the default mode or the configured mode, that the last 1 symbol in slot (n−1) of the fourth link is unavailable. Available symbols using the NCP in slot (n) of the third link are indexed from #0 to #13, and available symbols using the ECP in slot (n) of the third link are indexed from #0 to #11.

Processing Mode 16

In the case where the PD is greater than the difference obtained by subtracting the gap from the T_symbol, it is determined, by using the first mode, that attributes of the first i3 symbols in slot (n) of the third link are attributes of being unavailable. n is an integer greater than or equal to 0, and i3 is an integer greater than or equal to 1.

As shown in FIG. 17, assuming that m=0, then in the case where (T_symbol−gap)<PD<T_symbol, or in the case where (T_symbol−gap−transient period)<PD<T_symbol, or in the case where (T_symbol−gap)<E_offset<T_symbol, or in the case where (T_symbol−gap−transient period)<E_offset<T_symbol, the parent node determines, by using the default mode or the configured mode, that the first 2 symbols in slot (n) of the third link are unavailable, and the child node determines, by using the default mode or the configured mode, that the first 2 symbols in slot (n) of the third link are unavailable. Available symbols using the NCP in slot (n) of the third link are indexed from #2 to #13, and available symbols using the ECP in slot (n) of the third link are indexed from #2 to #11.

Processing Mode 17

In the case where the PD is greater than the difference obtained by subtracting the gap from the T_symbol, it is determined, by using the first mode, that attributes of the last j4 symbols in slot (n−1) of the fourth link are attributes of being unavailable. n is an integer greater than or equal to 0, and j4 is an integer greater than or equal to 1.

As shown in FIG. 19, assuming that m=0, then in the case where (T_symbol−gap)<PD<T_symbol, or in the case where (T_symbol−gap−transient period)<PD<T_symbol, or in the case where (T_symbol−gap)<E_offset<T_symbol, or in the case where (T_symbol−gap−transient period) <E_offset<T_symbol, the parent node determines, by using the default mode or the configured mode, that the last 2 symbols in slot (n−1) of the fourth link are unavailable, and the child node determines, by using the default mode or the configured mode, that the last 2 symbols in slot (n−1) of the fourth link are unavailable. Available symbols using the NCP in slot (n) of the third link are indexed from #0 to #13, and available symbols using the ECP in slot (n) of the third link are indexed from #0 to #11.

Processing Mode 18

In the case where the PD is greater than the difference obtained by subtracting the gap from the T_symbol, it is determined, by using the first mode, that attributes of the first i3 symbols in slot (n) of the third link and attributes of the last j4 symbols in slot (n−1) of the fourth link are attributes of being unavailable. n is an integer greater than or equal to 0, and i3 and j4 are each an integer greater than or equal to 1.

As shown in FIG. 21, assuming that m=0, then in the case where (T_symbol−gap)<PD<T_symbol, or in the case where (T_symbol−gap−transient period)<PD<T_symbol, or in the case where (T_symbol−gap)<E_offset<T_symbol, or in the case where (T_symbol−gap−transient period) <E_offset<T_symbol, the parent node determines, by using the default mode or the configured mode, that the first 1 symbol in slot (n) of the third link and the last 1 symbol in slot (n−1) of the fourth link are unavailable, and the child node determines, by using the default mode or the configured mode, that the first 1 symbol in slot (n) of the third link and the last 1 symbol in slot (n−1) of the fourth link are unavailable. Available symbols using the NCP in slot (n) of the third link are indexed from #1 to #13, and available symbols using the ECP in slot (n) of the third link are indexed from #1 to #11.

Different from the previous embodiment, this embodiment further includes determining a PD or an E_offset. In the examples described later, the first node is a parent node, and the second node is a child node.

In the case where a first condition is satisfied, the PD or the E_offset of the second node is calculated based on a TA and a T_offset or based on the TA and a T_delta.

The first condition is one of the conditions below.

The first node has no external synchronization source, and the second node has no external synchronization source; the first node has no external synchronization source, and the second node has an external synchronization source; the first node has an external synchronization source, and the second node has an external synchronization source; or the first node has an external synchronization source, and the second node has no external synchronization source.

For example, assuming that the parent node (first node) has no external synchronization source and the child node (second node) has no external synchronization source, then the parent node calculates the PD of the child node: PD= (TA+T_offset)/2=(TA/2+T_delta), and the child node calculates the PD of the child node: PD=(TA+T_offset)/2=(TA/ 2+T_delta). This means that the PD of the child node calculated by the parent node and the PD of the child node calculated by the child node are the same, that is, a consistent understanding of the PD is achieved between the nodes.

In the case where the first node has no external synchronization source and the second node has an external synchronization source, the method further includes receiving a PD or an E_offset sent by the second node.

For example, assuming that the parent node has no external synchronization source and the child node has an external synchronization source, then the child node calculates the PD of the child node: PD=(DRT−DTT). Here the DRT is the DRT of the child node, and the DTT is the DTT of the child node obtained according to the GNSS. The parent node receives the PD reported by the child node to the parent node. This means that the PD of the child node calculated by the parent node and the PD of the child node calculated by the child node are the same, that is, a consistent understanding of the PD is achieved between the nodes.

Assuming that the parent node has no external synchronization source and the child node has an external synchronization source, then the parent node calculates the PD of the child node: PD=(TA+T_offset)/2=(TA/2+T_delta), and the child node calculates the PD of the child node: PD=(TA+ T_offset)/2=(TA/2+T_delta). This means that the PD of the child node calculated by the parent node and the PD of the child node calculated by the child node are the same, that is, a consistent understanding of the PD is achieved between the nodes.

In the case where the first node has an external synchronization source and the second node has an external synchronization source, the PD or the E_offset of the second node is calculated based on a DRT and a DTT1. Here the DRT is the DRT of the second node calculated by the first node, and the DTT1 is the DTT of the first node obtained by the first node according to the GNSS.

For example, assuming that the parent node has an external synchronization source and the child node has an external synchronization source, then the parent node calculates the PD of the child node: PD=(DRT−DTT1), where the DRT is the DRT of the child node calculated by the parent node, and the DTT1 is the DTT of the parent node obtained by the parent node according to the GNSS; and the child node calculates the PD of the child node: PD=(DRT− DTT2), where the DRT is the DRT of the child node, and the DTT2 is the DTT of the child node obtained by the child node according to the GNSS. Here the DTT1 and the DTT2 are the same. This means that the PD of the child node calculated by the parent node and the PD of the child node calculated by the child node are the same, that is, a consistent understanding of the PD is achieved between the nodes.

Assuming that the parent node has an external synchronization source and the child node has an external synchronization source, then the parent node calculates the PD of the child node: PD=(TA+T_offset)/2=(TA/2+T_delta), and the child node calculates the PD of the child node: PD=(TA+ T_offset)/2=(TA/2+T_delta). This means that the PD of the child node calculated by the parent node and the PD of the child node calculated by the child node are the same, that is, a consistent understanding of the PD is achieved between the nodes.

Assuming that the parent node has an external synchronization source and the child node has no external synchronization source, then the parent node calculates the PD of the child node: PD=(TA+T_offset)/2=(TA/2+T_delta), and the child node calculates the PD of the child node: PD=(TA+T_offset)/2=(TA/2+T_delta). This means that the PD of the child node calculated by the parent node and the PD of the child node calculated by the child node are the same, that is, a consistent understanding of the PD is achieved between the nodes.

In the case where the first node has no external synchronization source and the second node has no external synchronization source, the method further includes receiving at least one of the following reported by the second node to the first node: attributes of the first i symbols in slot (n) of the first or third link; or attributes of the last j symbols in slot (n) of the first or third link n is an integer greater than or equal to 0, and i and j are each an integer greater than or equal to 0.

For example, assuming that the parent node has no external synchronization source and the child node has no external synchronization source, then the child node calculates the PD of the child node: PD=(DRT−DTT). Here the DRT is the DRT of the child node, and the DTT is the DTT of the child node obtained according to the GNSS. The parent node receives at least one of attributes of the first i symbols in slot (n) of the first or third link or attributes of the last j symbols in slot (n) of the first or third link reported by the child node to the parent node.

Similarly, in this embodiment, the method may further include using the symbol as a gap in the case where the symbol has the attribute of being unavailable.

The method further includes extending, based on a subcarrier spacing, the symbol having the attribute of being unavailable, where the subcarrier spacing is obtained by multiplying, by k, a subcarrier spacing corresponding to the symbol having the attribute of being unavailable. x symbols in the symbols obtained by the extension have attributes of being unavailable, and k−x symbols in the symbols obtained by the extension have attributes of being available. k is an integer greater than 1, and x is an integer greater than or equal to 1.

The method further includes rounding a time offset T_offset or T_delta according to a symbol boundary or a slot boundary in the case where uplink receive timing of the first node and uplink receive timing of the second node are not aligned with each other.

The method further includes determining, based on a symbol having the attribute of being unavailable within a preset duration, start and end points of a symbol having the attribute of being available and the range of the symbol having the attribute of being available.

These processings are the same as those in the previous embodiments and thus are not repeated here.

The present application further provides an embodiment for a second node. In an example embodiment, a symbol attribute determination method is provided. The method is applied to a second node. As shown in FIG. 23, the method includes the step below.

In step 31, the attribute of a symbol is determined by using a second mode. The attribute includes the attribute of being unavailable or the attribute of being available. The second mode is a default mode or a mode configured by a first node.

Definitions of links are the same as those described in the previous embodiment and thus are not repeated here.

Additionally, the attribute of a symbol of the second node may be determined by being configured by the first node or may be determined by the second node according to a protocol.

Based on the description of the preceding solution, the step in which the attribute of a symbol is determined by using a second mode may be performed by using one of the processing modes below.

Processing Mode 1

It is determined, by using the second mode, that attributes of the first i1 symbols in slot (n) of the first link and attributes of the last j1 symbols in slot (n+m) of the first link are attributes of being unavailable. n and m are each an integer greater than or equal to 0, and i1 and j1 are each an integer greater than or equal to 1.

Processing Mode 2

It is determined, by using the second mode, that attributes of the last j2 symbols in slot (n−1) of the second link and attributes of the last j1 symbols in slot (n+m) of the first link are attributes of being unavailable. n and m are each an integer greater than or equal to 0, and j2 and j1 are each an integer greater than or equal to 1.

Processing Mode 3

It is determined, by using the second mode, that attributes of the first i1 symbols in slot (n) of the first link and attributes of the first i2 symbols in slot (n+m+1) of the second link are attributes of being unavailable. n and m are each an integer greater than or equal to 0, and i1 and i2 are each an integer greater than or equal to 1.

Processing Mode 4

It is determined, by using the second mode, that attributes of the last j2 symbols in slot (n−1) of the second link and attributes of the first i2 symbols in slot (n+m+1) of the second link are attributes of being unavailable. n and m are each an integer greater than or equal to 0, and j2 and i2 are each an integer greater than or equal to 1.

Processing Mode 5

It is determined, by using the second mode, that attributes of the last j1 symbols in slot (n+m) of the first link are attributes of being unavailable. n and m are each an integer greater than or equal to 0, and j1 is an integer greater than or equal to 1.

Processing Mode 6

It is determined, by using the second mode, that attributes of the first i2 symbols in slot (n+m+1) of the second link are attributes of being unavailable. n and m are each an integer greater than or equal to 0, and i2 is an integer greater than or equal to 1.

Processing Mode 7

It is determined, by using the second mode, that attributes of the last j1 symbols in slot (n) of the first link and attributes of the first i2 symbols in slot (n+m+1) of the second link are attributes of being unavailable. n and m are each an integer greater than or equal to 0, and j1 and i2 are each an integer greater than or equal to 1.

Processing Mode 8

It is determined, by using the second mode, that attributes of the first i3 symbols in slot (n) of the third link and attributes of the last j3 symbols in slot (n+m) of the third link are attributes of being unavailable. n and m are each an integer greater than or equal to 0, and i3 and j3 are each an integer greater than or equal to 1.

Processing Mode 9

It is determined, by using the second mode, that attributes of the last j4 symbols in slot (n−1) of the fourth link and attributes of the last j3 symbols in slot (n+m) of the third link are attributes of being unavailable. n and m are each an integer greater than or equal to 0, and j4 and j3 are each an integer greater than or equal to 1.

Processing Mode 10

It is determined, by using the second mode, that attributes of the first i3 symbols in slot (n) of the third link and attributes of the first i4 symbols in slot (n+m+1) of the fourth link are attributes of being unavailable. n and m are each an integer greater than or equal to 0, and i3 and i4 are each an integer greater than or equal to 1.

Processing Mode 11

It is determined, by using the second mode, that attributes of the last j4 symbols in slot (n−1) of the fourth link and attributes of the first i4 symbols in slot (n+m+1) of the fourth link are attributes of being unavailable. n and m are each an integer greater than or equal to 0, and j4 and i4 are each an integer greater than or equal to 1.

Processing Mode 12

It is determined, by using the second mode, that attributes of the first i3 symbols in slot (n) of the third link are attributes of being unavailable. n is an integer greater than or equal to 0, and i3 is an integer greater than or equal to 1.

Processing Mode 13

It is determined, by using the second mode, that attributes of the last j4 symbols in slot (n−1) of the fourth link are attributes of being unavailable. n is an integer greater than or equal to 0, and j4 is an integer greater than or equal to 1.

Processing Mode 14

It is determined, by using the second mode, that attributes of the first i3 symbols in slot (n) of the third link and attributes of the last j4 symbols in slot (n−1) of the fourth link are attributes of being unavailable. n is an integer greater than or equal to 0, and i3 and j4 are each an integer greater than or equal to 1.

The default mode may be a mode specified in a protocol or may be understood as a mode determined by negotiation between the first node and the second node.

In this embodiment, the determination of the attribute of a symbol may be configured, by the first node, to the second node, that is, the second node receives the attribute configured by the first node. As described in Table 1, the first node determines an unavailable symbol according to the content of the row corresponding to a default index (for example, index=0). The default index of the second node is the same as the default index (for example, index=0) of the first node. The second node determines an unavailable symbol according to the content of the row corresponding to the default index. The preferred value of j1 and the preferred value of i2 are each less than or equal to 30 symbols.

As described in Table 2, the first node determines an unavailable symbol according to the content of the row corresponding to a default index (for example, index=0). The default index of the second node is the same as the default index (for example, index=0) of the first node. The second node determines an unavailable symbol according to the content of the row corresponding to the default index. The preferred value of i3 and the preferred value of j4 are each less than or equal to 30 symbols.

Alternatively, as described in Table 1, the first node configures an index according to $\lceil \log_2(x) \rceil$ binary bits and determines an unavailable symbol according to the content of the row corresponding to the index, and the second node is configured with the $\lceil \log_2(x) \rceil$ binary bits, determines a corresponding index according to a binary bit state and determines an unavailable symbol according to the content of the row corresponding to the index. x indicates the maximum index. $\lceil \ \rceil$ indicates rounding up.

Alternatively, as described in Table 2, the first node configures an index according to $\lceil \log_2(y) \rceil$ binary bits and determines an unavailable symbol according to the content of the row corresponding to the index, and the second node is configured with the $\lceil \log_2(y) \rceil$ binary bits, determines a corresponding index according to a binary bit state and determines an unavailable symbol according to the content of the row corresponding to the index. y indicates the maximum index. $\lceil \ \rceil$ indicates rounding up.

As described in Table 1 and Table 2, the two tables are combined into one table, the first node configures an index according to $\lceil \log_2(x+y) \rceil$ binary bits and determines an unavailable symbol according to the content of the row corresponding to the index, and the second node is configured with the $\lceil \log_2(x+y) \rceil$ binary bits, determines a corresponding index according to a binary bit state and determines an unavailable symbol according to the content of the row corresponding to the index. x+y indicates the maximum index. $\lceil \ \rceil$ indicates rounding up.

Another mode is described below.

The first node configures the first i1 symbols in slot (n) of the first link to be unavailable by using $\lceil \log_2(i1) \rceil$ binary bits. The first node configures the last j1 symbols in slot (n+m) of the first link to be unavailable by using $\lceil \log_2(j1) \rceil$ binary bits. The first node configures the first i2 symbols in slot (n+m+1) of the second link to be unavailable by using $\lceil \log_2(i2) \rceil$ binary bits. The first node configures the last j2 symbols in slot (n−1) of the second link to be unavailable by using $\lceil \log_2(j2) \rceil$ binary bits. The first node configures the first i3 symbols in slot (n) of the third link to be unavailable by using $\lceil \log_2(i3) \rceil$ binary bits. The first node configures the last j3 symbols in slot (n+m) of the third link to be unavailable by using $\lceil \log_2(j3) \rceil$ binary bits. The first node configures the first i4 symbols in slot (n+m+1) of the fourth link to be unavailable by using $\lceil \log_2(i4) \rceil$ binary bits. The first node configures the last j4 symbols in slot (n−1) of the fourth link are unavailable by using $\lceil \log_2(j4) \rceil$ binary bits. The second node is configured with the $\lceil \log_2(i1) \rceil$ binary bits and determines that the first i1 symbols in slot (n) of the first link are unavailable based on the binary bit state. The second node is configured with the $\lceil \log_2(j1) \rceil$ binary bits and determines that the last j1 symbols in slot (n+m) of the first link are unavailable based on the binary bit state. The second node is configured with $\lceil \log_2(i2) \rceil$ binary bits and determines that the first i2 symbols in slot (n+m+1) of the second link are unavailable based on the binary bit state. The second node is configured with the $\lceil \log_2(j2) \rceil$ binary bits and determines that the last j2 symbols in slot (n−1) of the second link are unavailable based on the binary bit state. The second node is configured with the $\lceil \log_2(i3) \rceil$ binary bits and determines that the first i3 symbols in slot (n) of the third link are unavailable based on the binary bit state. The second node is configured with the $\lceil \log_2(j3) \rceil$ binary bits and determines that the last j3 symbols in slot (n+m) of the third link are unavailable based on the binary bit state. The second node is configured with the $\lceil \log_2(i4) \rceil$ binary bits and determines that the first i4 symbols in slot (n+m+1) of the fourth link are unavailable based on the binary bit state. The second node is configured with the $\lceil \log_2(j4) \rceil$ binary bits and determines that the last j4 symbols in slot (n−1) of the fourth link are unavailable based on the binary bit state. The preferred values of i1, j1, i2, j2, i3, j3, i4 and j4 symbols are each less than or equal to 30 symbols (the symbols are the symbol durations corresponding to subcarrier spacing (SCS)_ref=15 kHz), and the preferred values of the corresponding binary bits are each less than or equal to 5 bits.

For example, in the case where SCS=$2\mu$*SCS_ref and $\mu$ is an integer greater than or equal to 0, the preferred values of i1, j1, i2, j2, i3, j3, i4 and j4 symbols are each less than or equal to 30 symbols (the symbols are the symbol durations corresponding to SCS=2μ*SCS_ref), and the preferred values of the corresponding binary bits are each less than or equal to 5 bits. Alternatively, in the case where SCS=2μ*SCS_ref and μ is an integer greater than or equal to 0, the preferred values of i1, j1, i2, j2, i3, j3, i4 and j4 are each less than or equal to 2μ*30 symbols (the symbols are the symbol durations corresponding to SCS=2μ*SCS_ref), and the preferred values of the corresponding binary bits are each less than or equal to (μ+5) bits.

In this embodiment, based on the preceding solution, the method may further include using the symbol as a gap in the case where the symbol has the attribute of being unavailable.

The method further includes extending, based on a subcarrier spacing, the symbol having the attribute of being unavailable, where the subcarrier spacing is obtained by multiplying, by k, a subcarrier spacing corresponding to the symbol having the attribute of being unavailable, x symbols in the symbols obtained by the extension have attributes of being unavailable, and k−x symbols in the symbols obtained by the extension have attributes of being available. k is an integer greater than 1, and x is an integer greater than or equal to 1.

The extending may be understood as shortening the duration of a symbol by 1/k and increasing the number of symbols by k times the original symbol duration. For example, the duration of one symbol corresponding to SCS_ref=15 kHz is T_symbol_ref, and after extension by two times, SCS=30 kHz, two symbols are obtained, and the duration of one symbol is T_symbol=T_symbol_ref/2. That is, after the extention, the duration of one symbol is 1/k of the original, and the number of symbols is k times the original.

Additionally, the method further includes rounding a time offset T_offset or T_delta according to a symbol boundary or a slot boundary in the case where uplink receive timing of the first node and uplink receive timing of the second node are not aligned with each other. Whether rounding up or rounding down is used may be selected depending on the actual situation. The details are not listed here.

The method further includes determining, based on a symbol having the attribute of being unavailable within a preset duration, start and end points of a symbol having the attribute of being available and the range of the symbol having the attribute of being available. That is, symbols other than symbols having the attribute of being unavailable within a preset duration are available symbols. That is, the start position and the end position of the available symbols can be determined based on the unavailable symbols. In this manner, the range of the symbols having the attribute of being available can be determined based on the start position and the end position.

In an example embodiment, a symbol attribute determination method is provided. The method is applied to a second node. As shown in FIG. 24, the method includes the step below.

In step 41, the attribute of a symbol is determined according to at least one parameter by using a second mode. The attribute includes the attribute of being unavailable or the attribute of being available. The second mode is a default mode or a mode configured by a first node.

The at least one parameter includes at least one of a propagation delay (PD); an equivalent time difference E_offset; a receive-transmit switching gap; a symbol duration T_symbol; or a transient period.

In this embodiment, definitions of the default mode, configured mode and links are the same as those described in the previous embodiment and thus are not repeated here.

In this embodiment, the step in which the attribute of a symbol is determined according to at least one parameter by using a second mode may be performed by using one of the processing modes below.

Processing Mode 1

In the case where the PD is less than the gap, it is determined, by using the second mode, that attributes of the first i1 symbols in slot (n) of the first link and attributes of the last j1 symbols in slot (n+m) of the first link are attributes of being unavailable. n and m are each an integer greater than or equal to 0, and i1 and j1 are each an integer greater than or equal to 1.

Processing Mode 2

In the case where the PD is less than the gap, it is determined, by using the second mode, that attributes of the last j2 symbols in slot (n−1) of the second link and attributes of the last j1 symbols in slot (n+m) of the first link are attributes of being unavailable. n and m are each an integer greater than or equal to 0, and j2 and j1 are each an integer greater than or equal to 1.

Processing Mode 3

In the case where the PD is less than the gap, it is determined, by using the second mode, that attributes of the first i1 symbols in slot (n) of the first link and attributes of the first i2 symbols in slot (n+m+1) of the second link are attributes of being unavailable. n and m are each an integer greater than or equal to 0, and i1 and i2 are each an integer greater than or equal to 1.

Processing Mode 4

In the case where the PD is less than the gap, it is determined, by using the second mode, that attributes of the last j2 symbols in slot (n−1) of the second link and attributes of the first i2 symbols in slot (n+m+1) of the second link are attributes of being unavailable. n and m are each an integer greater than or equal to 0, and j2 and i2 are each an integer greater than or equal to 1.

Processing Mode 5

In the case where the PD is greater than the gap and less than the difference obtained by subtracting the gap from the T_symbol, it is determined, by using the second mode, that attributes of the last j1 symbols in slot (n+m) of the first link are attributes of being unavailable. n and m are each an integer greater than or equal to 0, and j1 is an integer greater than or equal to 1.

Processing Mode 6

In the case where the PD is greater than the gap and less than the difference obtained by subtracting the gap from the T_symbol, it is determined, by using the second mode, that attributes of the first i2 symbols in slot (n+m+1) of the second link are attributes of being unavailable. n and m are each an integer greater than or equal to 0, and i2 is an integer greater than or equal to 1.

Processing Mode 7

In the case where the PD is greater than the difference obtained by subtracting the gap from the T_symbol, it is determined, by using the second mode, that attributes of the last j1 symbols in slot (n+m) of the first link are attributes of being unavailable. n and m are each an integer greater than or equal to 0, and j1 is an integer greater than or equal to 1.

Processing Mode 8

In the case where the PD is greater than the difference obtained by subtracting the gap from the T_symbol, it is determined, by using the second mode, that attributes of the first i2 symbols in slot (n+m+1) of the second link are attributes of being unavailable. n and m are each an integer greater than or equal to 0, and i2 is an integer greater than or equal to 1.

Processing Mode 9

In the case where the PD is greater than the difference obtained by subtracting the gap from the T_symbol, it is determined, by using the second mode, that attributes of the last j1 symbols in slot (n) of the first link and attributes of the first i2 symbols in slot (n+m+1) of the second link are attributes of being unavailable. n and m are each an integer greater than or equal to 0, and j1 and i2 are each an integer greater than or equal to 1.

Processing Mode 10

In the case where the PD is less than the gap, it is determined, by using the second mode, that attributes of the first i3 symbols in slot (n) of the third link and attributes of the last j3 symbols in slot (n+m) of the third link are attributes of being unavailable. n and m are each an integer greater than or equal to 0, and i3 and j3 are each an integer greater than or equal to 1.

Processing Mode 11

In the case where the PD is less than the gap, it is determined, by using the second mode, that attributes of the last j4 symbols in slot (n−1) of the fourth link and attributes of the last j3 symbols in slot (n+m) of the third link are attributes of being unavailable. n and m are each an integer greater than or equal to 0, and j4 and j3 are each an integer greater than or equal to 1.

Processing Mode 12

In the case where the PD is less than the gap, it is determined, by using the second mode, that attributes of the first i3 symbols in slot (n) of the third link and attributes of the first i4 symbols in slot (n+m+1) of the fourth link are attributes of being unavailable. n and m are each an integer greater than or equal to 0, and i3 and i4 are each an integer greater than or equal to 1.

Processing Mode 13

In the case where the PD is less than the gap, it is determined, by using the second mode, that attributes of the last j4 symbols in slot (n−1) of the fourth link and attributes of the first i4 symbols in slot (n−1) of the fourth link are attributes of being unavailable. n and m are each an integer greater than or equal to 0, and j4 and i4 are each an integer greater than or equal to 1.

Processing Mode 14

In the case where the PD is greater than the gap and less than the difference obtained by subtracting the gap from the T_symbol, it is determined, by using the second mode, that attributes of the first i3 symbols in slot (n) of the third link are attributes of being unavailable. n is an integer greater than or equal to 0, and i3 is an integer greater than or equal to 1.

Processing Mode 15

In the case where the PD is greater than the gap and less than the difference obtained by subtracting the gap from the T_symbol, it is determined, by using the second mode, that attributes of the last j4 symbols in slot (n−1) of the fourth link are attributes of being unavailable. n is an integer greater than or equal to 0, and j4 is an integer greater than or equal to 1.

Processing Mode 16

In the case where the PD is greater than the difference obtained by subtracting the gap from the T_symbol, it is determined, by using the second mode, that attributes of the first i3 symbols in slot (n) of the third link are attributes of being unavailable. n is an integer greater than or equal to 0, and i3 is an integer greater than or equal to 1.

Processing Mode 17

In the case where the PD is greater than the difference obtained by subtracting the gap from the T_symbol, it is determined, by using the second mode, that attributes of the last j4 symbols in slot (n−1) of the fourth link are attributes of being unavailable. n is an integer greater than or equal to 0, and j4 is an integer greater than or equal to 1.

Processing Mode 18

In the case where the PD is greater than the difference obtained by subtracting the gap from the T_symbol, it is determined, by using the second mode, that attributes of the first i3 symbols in slot (n) of the third link and attributes of the last j4 symbols in slot (n−1) of the fourth link are attributes of being unavailable. n is an integer greater than or equal to 0, and i3 and j4 are each an integer greater than or equal to 1.

Different from the previous embodiment, this embodiment further includes determining a PD or an E_offset. In the examples described later, the first node is a parent node, and the second node is a child node.

In the case where a first condition is satisfied, the PD or the E_offset of the second node is calculated based on a TA and a T_offset or based on the TA and a T_delta.

The first condition is one of the conditions below.

The first node has no external synchronization source, and the second node has no external synchronization source; the first node has no external synchronization source, and the second node has an external synchronization source; the first node has an external synchronization source, and the second node has an external synchronization source; or the first node has an external synchronization source, and the second node has no external synchronization source.

For example, assuming that the parent node (first node) has no external synchronization source and the child node (second node) has no external synchronization source, then the parent node calculates the PD of the child node: $PD=(TA+T\_offset)/2=(TA/2+T\_delta)$, and the child node calculates the PD of the child node: $PD=(TA+T\_offset)/2=(TA/2+T\_delta)$. This means that the PD of the child node calculated by the parent node and the PD of the child node calculated by the child node are the same, that is, a consistent understanding of the PD is achieved between the nodes.

In the case where the first node has no external synchronization source and the second node has an external synchronization source, the method further includes calculating the PD based on downlink receive timing (DRT) and downlink transmit timing (DTT) and sending the PD or the E_offset to the first node.

Here the DRT is the DRT of the second node, and the DTT is the DTT of the second node obtained by the second node according to a GNSS.

For example, assuming that the parent node has no external synchronization source and the child node has an external synchronization source, then the child node calculates the PD of the child node: $PD=(DRT-DTT)$. Here the DRT is the DRT of the child node, and the DTT is the DTT of the child node obtained according to the GNSS. The parent node receives the PD reported by the child node to the parent node. This means that the PD of the child node calculated by the parent node and the PD of the child node calculated by the child node are the same, that is, a consistent understanding of the PD is achieved between the nodes.

Assuming that the parent node has no external synchronization source and the child node has an external synchronization source, then the parent node calculates the PD of the child node: $PD=(TA+T\_offset)/2=(TA/2+T\_delta)$, and the child node calculates the PD of the child node: $PD=(TA+T\_offset)/2=(TA/2+T\_delta)$. This means that the PD of the child node calculated by the parent node and the PD of the child node calculated by the child node are the same, that is, a consistent understanding of the PD is achieved between the nodes.

In the case where the first node has an external synchronization source and the second node has an external synchronization source, the PD or the E_offset of the second node is calculated based on a DRT and a DTT2. Here the DRT is the DRT of the second node, and the DTT2 is the DTT of the second node obtained by the second node according to the GNSS.

For example, assuming that the parent node has an external synchronization source and the child node has an external synchronization source, then the parent node calculates the PD of the child node: PD=(DRT−DTT1), where the DRT is the DRT of the child node calculated by the parent node, and the DTT1 is the DTT of the parent node obtained by the parent node according to the GNSS; and the child node calculates the PD of the child node: PD=(DRT−DTT2), where the DRT is the DRT of the child node, and the DTT2 is the DTT of the child node obtained by the child node according to the GNSS. Here the DTT1 and the DTT2 are the same. This means that the PD of the child node calculated by the parent node and the PD of the child node calculated by the child node are the same, that is, a consistent understanding of the PD is achieved between the nodes.

Assuming that the parent node has an external synchronization source and the child node has an external synchronization source, then the parent node calculates the PD of the child node: PD=(TA+T_offset)/2=(TA/2+T_delta), and the child node calculates the PD of the child node: PD=(TA+T_offset)/2=(TA/2+T_delta). This means that the PD of the child node calculated by the parent node and the PD of the child node calculated by the child node are the same, that is, a consistent understanding of the PD is achieved between the nodes.

Assuming that the parent node has an external synchronization source and the child node has no external synchronization source, then the parent node calculates the PD of the child node: PD=(TA+T_offset)/2=(TA/2+T_delta), and the child node calculates the PD of the child node: PD=(TA+T_offset)/2=(TA/2+T_delta). This means that the PD of the child node calculated by the parent node and the PD of the child node calculated by the child node are the same, that is, a consistent understanding of the PD is achieved between the nodes.

In the case where the first node has no external synchronization source and the second node has no external synchronization source, the method further includes calculating the PD or the E_offset based on DRT and DTT and reporting at least one of the following to the first node: attributes of the first i symbols in slot (n) of the first or third link; or attributes of the last j symbols in the slot (n) of the first or third link. n is an integer greater than or equal to 0, and i and j are each an integer greater than or equal to 0.

For example, assuming that the parent node has no external synchronization source and the child node has no external synchronization source, then the child node calculates the PD of the child node: PD=(DRT−DTT). Here the DRT is the DRT of the child node, and the DTT is the DTT of the child node obtained according to the GNSS. The parent node receives at least one of attributes of the first i symbols in slot (n) of the first or third link or attributes of the last j symbols in slot (n) of the first or third link reported by the child node to the parent node.

Similarly, in this embodiment, the method may further include using the symbol as a gap in the case where the symbol has the attribute of being unavailable.

The method further includes extending, based on a subcarrier spacing, the symbol having the attribute of being unavailable, where the subcarrier spacing is obtained by multiplying, by k, a subcarrier spacing corresponding to the symbol having the attribute of being unavailable. x symbols in the symbols obtained by the extension have attributes of being unavailable, and k−x symbols in the symbols obtained by the extension have attributes of being available. k is an integer greater than 1, and x is an integer greater than or equal to 1.

The method further includes rounding a time offset T_offset or T_delta according to a symbol boundary or a slot boundary in the case where uplink receive timing of the first node and uplink receive timing of the second node are not aligned with each other.

The method further includes determining, based on a symbol having the attribute of being unavailable within a preset duration, start and end points of a symbol ha the attribute of being available and the range of the symbol having the attribute of being available.

These processings are the same as those in the previous embodiments and thus are not repeated here.

Figure 25:
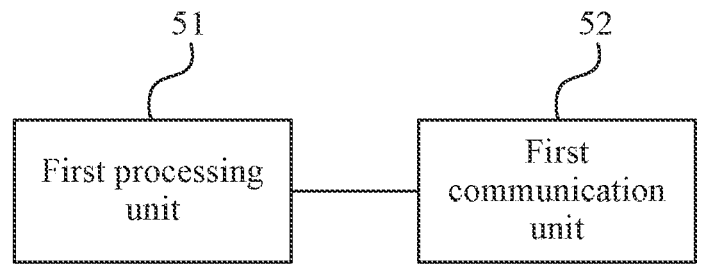
FIG. 25 is diagram one illustrating the structure of a node according to an embodiment of the present application.

In an example embodiment, a node is provided. As shown in FIG. 25, the node includes a first processing unit 51.

The first processing unit 51 is configured to determine the attribute of a symbol by using a first mode. The attribute includes the attribute of being unavailable or the attribute of being available. The first mode is a default mode or a configured mode.

Based on the description of the preceding solution, the step in which the attribute of a symbol is determined by using a first mode may be performed by using one of the processing modes below.

The first processing unit 51 is configured to determine, by using the first mode, that attributes of the first i1 symbols in slot (n) of the first link and attributes of the last j1 symbols in slot (n+m) of the first link are attributes of being unavailable. n and m are each an integer greater than or equal to 0, and i1 and j1 are each an integer greater than or equal to 1.

The first processing unit 51 is configured to determine, by using the first mode, that attributes of the last j2 symbols in slot (n−1) of the second link and attributes of the last j1 symbols in slot (n+m) of the first link are attributes of being unavailable. n and m are each an integer greater than or equal to 0, and j2 and j1 are each an Integer greater than or equal to 1.

The first processing unit 51 is configured to determine, by using the first mode, that attributes of the first i1 symbols in slot (n) of the first link and attributes of the first i2 symbols in slot (n+m+1) of the second link are attributes of being unavailable. n and m are each an integer greater than or equal to 0, and i1 and i2 are each an integer greater than or equal to 1.

The first processing unit 51 is configured to determine, by using the first mode, that attributes of the last j2 symbols in slot (n−1) of the second link and attributes of the first i2 symbols in slot (n+m+1) of the second link are attributes of being unavailable. n and m are each an integer greater than or equal to 0, and j2 and i2 are each an integer greater than or equal to 1.

The first processing unit 51 is configured to determine, by using the first mode, that attributes of the last j1 symbols in slot (n+m) of the first link are attributes of being unavailable. n and m are each an integer greater than or equal to 0, and j1 is an integer greater than or equal to 1.

The first processing unit 51 is configured to determine, by using the first mode, that attributes of the first i2 symbols in slot (n+m+1) of the second link are attributes of being unavailable. n and m are each an integer greater than or equal to 0, and i2 is an integer greater than or equal to 1.

The first processing unit 51 is configured to determine, by using the first mode, that attributes of the last j1 symbols in slot (n) of the first link and attributes of the first i2 symbols in slot (n+m+1) of the second link are attributes of being unavailable. n and m are each an integer greater than or equal to 0, and j1 and i2 are each an integer greater than or equal to 1.

The first processing unit 51 is configured to determine, by using the first mode, that attributes of the first i3 symbols in slot (n) of the third link and attributes of the last j3 symbols in slot (n+m) of the third link are attributes of being unavailable. n and m are each an integer greater than or equal to 0, and i3 and j3 are each an integer greater than or equal to 1.

The first processing unit 51 is configured to determine, by using the first mode, that attributes of the last j4 symbols in slot (n−1) of the fourth link and attributes of the last j3 symbols in slot (n+m) of the third link are attributes of being unavailable. n and m are each an integer greater than or equal to 0, and j4 and j3 are each an integer greater than or equal to 1.

The first processing unit 51 is configured to determine, by using the first mode, that attributes of the first i3 symbols in slot (n) of the third link and attributes of the first i4 symbols in slot (n+m+1) of the fourth link are attributes of being unavailable. n and m are each an integer greater than or equal to 0, and i3 and i4 are each an integer greater than or equal to 1.

The first processing unit 51 is configured to determine, by using the first mode, that attributes of the last j4 symbols in slot (n−1) of the fourth link and attributes of the first i4 symbols in slot (n+m+1) of the fourth link are attributes of being unavailable. n and m are each an integer greater than or equal to 0, and j4 and i4 are each an integer greater than or equal to 1.

The first processing unit 51 is configured to determine, by using the first mode, that attributes of the first i3 symbols in slot (n) of the third link are attributes of being unavailable. n is an integer greater than or equal to 0, and i3 is an integer greater than or equal to 1.

The first processing unit 51 is configured to determine, by using the first mode, that attributes of the last j4 symbols in slot (n−1) of the fourth link are attributes of being unavailable. n is an integer greater than or equal to 0, and j4 is an integer greater than or equal to 1.

The first processing unit 51 is configured to determine, by using the first mode, that attributes of the first i3 symbols in slot (n) of the third link and attributes of the last j4 symbols in slot (n−1) of the fourth link are attributes of being unavailable. n is an integer greater than or equal to 0, and i3 and j4 are each an integer greater than or equal to 1.

As shown in FIG. 21, assuming that m=0, then the parent node determines, by using the default mode or the configured mode, that the first 1 symbol in slot (n) of the third link and the last 1 symbol in slot (n−1) of the fourth link are unavailable, and the child node determines, by using the default mode or the configured mode, that the first 1 symbol in slot (n) of the third link and the last 1 symbol in slot (n−1) of the fourth link are unavailable. Available symbols using the NCP in slot (n) of the third link are indexed from #1 to #13, and available symbols using the ECP in slot (n) of the third link are indexed from #1 to #11.

The default mode may be a mode specified in a protocol or may be understood as a mode determined by negotiation between the first node and the second node.

In this embodiment, the determination of the attribute of a symbol may be configured by the first node to the second node, that is, a first communication unit 52 of the first node is configured to configure the attribute configured to. In this manner, both the first node and the second node can perform processing based on the determined attribute of the symbol.

The first processing unit 51 is configured to use the symbol as a gap in the case where the symbol has the attribute of being unavailable.

The first processing unit 51 is configured to extend, based on a subcarrier spacing, the symbol having the attribute of being unavailable, where the subcarrier spacing is obtained by multiplying, by k, a subcarrier spacing corresponding to the symbol having the attribute of being unavailable. x symbols in the symbols obtained by the extension have attributes of being unavailable, and k−x symbols in the symbols obtained by the extension have attributes of being available. k is an integer greater than 1, and x is an integer greater than or equal to 1.

The extending may be understood as shortening the duration of a symbol by 1/k and increasing the number of symbols by k times the original symbol duration. For example, the duration of one symbol corresponding to SCS_ref=15 kHz is T_symbol_ref, and after extension by two times, SCS=30 kHz, two symbols are obtained, and the duration of one symbol is T_symbol=T_symbol_ref/2. That is, after the extension, the duration of one symbol is 1/k of the original, and the number of symbols is k times the original.

The first processing unit 51 is configured to round a time offset T_offset or T_delta according to a symbol boundary or a slot boundary in the case where uplink receive timing of the first node and uplink receive timing of the second node are not aligned with each other. Whether rounding up or rounding down is used may be selected depending on the actual situation. The details are not listed here.

The first processing unit 51 is configured to determine, based on a symbol having the attribute of being unavailable within a preset duration, start and end points of a symbol having the attribute of being available and the range of the symbol having the attribute of being available. That is, symbols other than symbols having the attribute of being unavailable within a preset duration are available symbols. That is, the start position and the end position of the available symbols can be determined based on the unavailable symbols. In this manner, the range of the symbols having the attribute of being available can be determined based on the start position and the end position.

Figure 26:
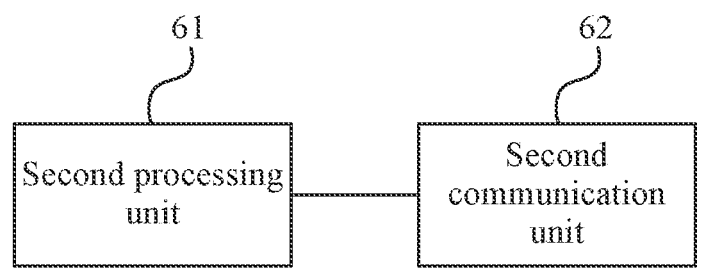
FIG. 26 is diagram two illustrating the structure of a node according to an embodiment of the present application.

In an example embodiment, a node is provided. As shown in FIG. 26, the node includes a second processing unit 61.

The second processing unit 61 is configured to determine the attribute of a symbol according to at least one parameter by using a first mode. The attribute includes the attribute of being unavailable or the attribute of being available. The first mode is a default mode or a configured mode.

The at least one parameter includes at least one of a propagation delay (PD); an equivalent time difference E_offset; a receive-transmit switching gap; a symbol duration T_symbol; or a transient period.

In this embodiment, definitions of the default mode, configured mode and links are the same as those described in the previous embodiment and thus are not repeated here.

In this embodiment, the step in which the attribute of a symbol is determined according to at least one parameter by using a first mode may be performed by using one of the processing modes below.

The second processing unit 61 is configured to, in the case where the PD is less than the gap, determine, by using the first mode, that attributes of the first i1 symbols in slot (n) of the first link and attributes of the last j1 symbols in slot (n+m) of the first link are attributes of being unavailable. n and m are each an integer greater than or equal to 0, and i1 and j1 are each an integer greater than or equal to 1.

The second processing unit 61 is configured to, in the case where the PD is less than the gap, determine, by using the first mode, that attributes of the last j2 symbols in slot (n−1) of the second link and attributes of the last j1 symbols in slot (n+m) of the first link are attributes of being unavailable. n and m are each an integer greater than or equal to 0, and j2 and j1 are each an integer greater than or equal to 1.

The second processing unit 61 is configured to, in the case where the PD is less than the gap, determine, by using the first mode, that attributes of the first i1 symbols in slot (n) of the first link and attributes of the first i2 symbols in slot (n+m+1) of the second link are attributes of being unavailable. n and m are each an integer greater than or equal to 0, and i1 and i2 are each an integer greater than or equal to 1.

The second processing unit 61 is configured to, in the case where the PD is less than the gap, determine, by using the first node, that attributes of the last j2 symbols in slot (n−1) of the second link and attributes of the first i2 symbols in slot (n+m+1) of the second link are attributes of being unavailable. n and m are each an integer greater than or equal to 0, and j2 and i2 are each an integer greater than or equal to 1.

The second processing unit 61 is configured to, in the case where the PD is greater than the gap and less than the difference obtained by subtracting the gap from the T_symbol, determine, by using the first mode, that attributes of the last j1 symbols in slot (n+m) of the first link are attributes of being unavailable. n and m are each an integer greater than or equal to 0, and j1 is an integer greater than or equal to 1.

The second processing unit 61 is configured to, in the case where the PD is greater than the gap and less than the difference obtained by subtracting the gap from the T_symbol, determine, by using the first mode, that attributes of the first i2 symbols in slot (n+m+1) of the second link are attributes of being unavailable. n and m are each an integer greater than or equal to 0, and i2 is an integer greater than or equal to 1.

The second processing unit 61 is configured to, in the case where the PD is greater than the difference obtained by subtracting the gap from the T_symbol, determine, by using the first mode, that attributes of the last j1 symbols in slot (n+m) of the first link are attributes of being unavailable. n and m are each an integer greater than or equal to 0, and j1 is an integer greater than or equal to 1.

The second processing unit 61 is configured to, in the case where the PD is greater than the difference obtained by subtracting the gap from the T_symbol, it is determined, by using the first mode, that attributes of the first i2 symbols in slot (n+m+1) of the second link are attributes of being unavailable. n and m are each an integer greater than or equal to 0, and i2 is an integer greater than or equal to 1.

The second processing unit 61 is configured to, in the case where the PD is greater than the difference obtained by subtracting the gap from the T_symbol, determine, by using the first mode, that attributes of the last j1 symbols in slot (n) of the first link and attributes of the first i2 symbols in slot (n+m+1) of the second link are attributes of being unavailable. n and m are each an integer greater than or equal to 0, and j1 and i2 are each an integer greater than or equal to 1.

The second processing unit 61 is configured to, in the case where the PD is less than the gap, determine, by using the first mode, that attributes of the first i3 symbols in slot (n) of the third link and attributes of the last j3 symbols in slot (n+m) of the third link are attributes of being unavailable. n and m are each an integer greater than or equal to 0, and i3 and j3 are each an integer greater than or equal to 1.

The second processing unit 61 is configured to, in the case where the PD is less than the gap, determine, by using the first mode, that attributes of the last j4 symbols in slot (n−1) of the fourth link and attributes of the last j3 symbols in slot (n+m) of the third link are attributes of being unavailable. n and m are each an integer greater than or equal to 0, and j4 and j3 are each an integer greater than or equal to 1.

The second processing unit 61 is configured to, in the case where the PD is less than the gap, determine, by using the first mode, that attributes of the first i3 symbols in slot (n) of the third link and attributes of the first i4 symbols in slot (n+m+1) of the fourth link are attributes of being unavailable. n and m are each an integer greater than or equal to 0, and i3 and i4 are each an integer greater than or equal to 1.

The second processing unit 61 is configured to, in the case where the PD is less than the gap, determine, by using the first mode, that attributes of the last j4 symbols in slot (n−1) of the fourth link and attributes of the first i4 symbols in slot (n+m+1) of the fourth link are attributes of being unavailable. n and m are each an integer greater than equal to 0, and j4 and i4 are each an integer greater than or equal to 1.

The second processing unit 61 is configured to, in the case where the PD is greater than the gap and less than the difference obtained by subtracting the gap from the T_symbol, determine, by using the first mode, that attributes of the first i3 symbols in slot (n) of the third link are attributes of being unavailable. n is an integer greater than or equal to 0, and i3 is an integer greater than or equal to 1.

The second processing unit 61 is configured to, in the case where the PD is greater than the gap and less than the difference obtained by subtracting the gap from the T_symbol, determine, by using the first mode, that attributes of the last j4 symbols in slot (n−1) of the fourth link are attributes of being unavailable. n is an integer greater than or equal to 0, and j4 is an integer greater than or equal to 1.

The second processing unit 61 is configured to, in the case where the PD is greater than the difference obtained by subtracting the gap from the T_symbol, determine, by using the first mode, that attributes of the first i3 symbols in slot (n) of the third link are attributes of being unavailable. n is an integer greater than or equal to 0, and i3 is an integer greater than or equal to 1.

The second processing unit 61 is configured to, in the case where the PD is greater than the difference obtained by subtracting the gap from the T_symbol, determine, by using the first mode, that attributes of the last j4 symbols in slot (n−1) of the fourth link are attributes of being unavailable. n is an integer greater than or equal to 0, and j4 is an integer greater than or equal to 1.

The second processing unit 61 is configured to, in the case where the PD is greater than the difference obtained by subtracting the gap from the T_symbol, determine, by using the first mode, that attributes of the first i3 symbols in slot (n) of the third link and attributes of the last j4 symbols in slot (n−1) of the fourth link are attributes of being unavailable. n is an integer greater than or equal to 0, and i3 and j4 are each an integer greater than or equal to 1.

Different from the previous embodiment, this embodiment further includes determining a PD or an E_offset. In the examples described later, the first node is a parent node, and the second node is a child node.

The second processing unit 61 is configured to, in the case where a first condition is satisfied, calculate the PD or the E_offset of the second node based on a TA and a T_offset or based on the TA and a T_delta.

The first condition is one of the conditions below.

The first node has no external synchronization source, and the second node has no external synchronization source; the first node has no external synchronization source, and the second node has an external synchronization source; the first node has an external synchronization source, and the second node has an external synchronization source; or the first node has an external synchronization source, and the second node has no external synchronization source.

For example, assuming that the parent node (first node) has no external synchronization source and the child node (second node) has no external synchronization source, then the parent node calculates the PD of the child node: PD=(TA+T_offset)/2=(TA/2+T_delta), and the child node calculates the PD of the child node: PD=(TA+T_offset)/2=(TA/2+T_delta). This means that the PD of the child node calculated by the parent node and the PD of the child node calculated by the child node are the same, that is, a consistent understanding of the PD is achieved between the nodes.

The second processing unit 61 is configured to, in the case where the first node has no external synchronization source and the second node has an external synchronization source, receive, by a second communication unit 62 of the first node, a PD or an E_offset sent by the second node.

For example, assuming that the parent node has no external synchronization source and the child node has an external synchronization source, then the child node calculates the PD of the child node: PD=(DRT−DTT). Here the DRT is the DRT of the child node, and the DTT is the DTT of the child node obtained according to the GNSS. The parent node receives the PD reported by the child node to the parent node. This means that the PD of the child node calculated by the parent node and the PD of the child node calculated by the child node are the same, that is, a consistent understanding of the PD is achieved between the nodes.

Assuming that the parent node has no external synchronization source and the child node has an external synchronization source, then the parent node calculates the PD of the child node: PD=(TA+T_offset)/2=(TA/2+T_delta), and the child node calculates the PD of the child node: PD=(TA+T_offset)/2=(TA/2+T_delta). This means that the PD of the child node calculated by the parent node and the PD of the child node calculated by the child node are the same, that is, a consistent understanding of the PD is achieved between the nodes.

The second processing unit 61 is configured to, in the case where the first node has an external synchronization source and the second node has an external synchronization source, calculate the PD or the E_offset of the second node based on a DRT and a DTT1. Here the DRT is the DRT of the second node calculated by the first node, and the DTT1 is the DTT of the first node obtained by the first node according to the GNSS.

The second communication unit 62 is configured to, in the case where the first node has no external synchronization source and the second node has no external synchronization source, receive at least one of the following reported by the second node to the first node: attributes of the first i symbols in slot (n) of the first or third link; or attributes of the last j symbols in slot (n) of the first or third link. n is an integer greater than or equal to 0, and i and j are each an integer greater than or equal to 0.

Figure 27:
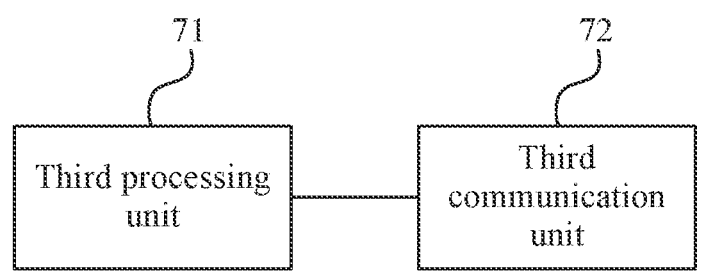
FIG. 27 is diagram three illustrating the structure of a node according to an embodiment of the present application.

The present application further provides an embodiment for a second node. In an example embodiment, a node is provided. As shown in FIG. 27, the node includes a third processing unit 71.

The third processing unit 71 is configured to determine the attribute of a symbol by using a second mode. The attribute includes the attribute of being unavailable or the attribute of being available. The second mode is a default mode or a mode configured by a first node.

Definitions of links are the same as those described in the previous embodiment and thus are not repeated here. Additionally, the attribute of a symbol of the second node may be determined by being configured by the first node or may be determined by the second node according to a protocol.

Based on the description of the preceding solution, the step in which the attribute of a symbol is determined by using a second mode may be performed by using one of the processing modes below.

The third processing unit 71 is configured to determine, by using the second mode, that attributes of the first i1 symbols in slot (n) of the first link and attributes of the last j1 symbols in slot (n+m) of the first link are attributes of being unavailable. n and m are each an integer greater than or equal to 0, and i1 and j1 are each an integer greater than or equal to 1.

The third processing unit 71 is configured to determine, by using the second mode, that attributes of the last j2 symbols in slot (n−1) of the second link and attributes of the last j1 symbols in slot (n+m) of the first link are attributes of being unavailable. n and m are each an integer greater than or equal to 0, and j2 and j1 are each an integer greater than or equal to 1.

The third processing unit 71 is configured to determine, by using the second mode, that attributes of the first i1 symbols in slot (n) of the first link and attributes of the first i2 symbols in slot (n+m+1) of the second link are attributes of being unavailable. n and m are each an integer greater than or equal to 0, and i1 and i2 are each an integer greater than or equal to 1.

The third processing unit 71 is configured to determine, by using the second mode, that attributes of the last j2 symbols in slot (n−1) of the second link and attributes of the first i2 symbols in slot (n+m+1) of the second link are attributes of icing unavailable. n and m are each an integer greater than or equal to 0, and j2 and i2 are each an integer greater than or equal to 1.

The third processing unit 71 is configured to determine, by using the second mode, that attributes of the last j1 symbols in slot (n+m) of the first link are attributes of being unavailable. n and m are each an integer greater than or equal to 0, and j1 is an integer greater than or equal to 1.

The third processing unit 71 is configured to determine, by using the second mode, that attributes of the first i2 symbols in slot (n+m+1) of the second link are attributes of being unavailable. n and m are each an integer greater than or equal to 0, and i2 is an integer greater than or equal to 1.

The third processing unit 71 is configured to determine, by using the second mode, that attributes of the last j1 symbols in slot (n) of the first link and attributes of the first i2 symbols in slot (n+m+1) of the second link are attributes of being unavailable. n and m are each an integer greater than or equal to 0, and j1 and i2 are each an integer greater than or equal to 1.

The third processing unit 71 is configured to determine, by using the second mode, that attributes of the first i3 symbols in slot (n) of the third link and attributes of the last j3 symbols in slot (n+m) of the third link are attributes of being unavailable. n and m are each an integer greater than or equal to 0, and i3 and j3 are each an integer greater than or equal to 1.

The third processing unit 71 is configured to determine, by using the second mode, that attributes of the last j4 symbols in slot (n−1) of the fourth link and attributes of the last j3 symbols in slot (n+m) of the third link are attributes of being unavailable. n and m are each an integer greater than or equal to 0, and j4 and j3 are each an integer greater than or equal to 1.

The third processing unit 71 is configured to determine, by using the second mode, that attributes of the first i3 symbols in slot (n) of the third link and attributes of the first i4 symbols in slot (n+m+1) of the fourth link are attributes of being unavailable. n and m are each an integer greater than or equal to 0, and i3 and i4 are each an integer greater than or equal to 1.

The third processing unit 71 is configured to determine, by using the second mode, that attributes of the last j4 symbols in slot (n−1) of the fourth link and attributes of the first i4 symbols in slot (n+m+1) of the fourth link are attributes of being unavailable. n and m are each an integer greater than or equal to 0, and j4 and i4 are each an integer greater than or equal to 1.

The third processing unit 71 is configured to determine, by using the second mode, that attributes of the first i3 symbols in slot (n) of the third link are attributes of being unavailable. n is an integer greater than or equal to 0, and i3 is an integer greater than or equal to 1.

The third processing unit 71 is configured to determine, by using the second mode, that attributes of the last j4 symbols in slot (n−1) of the fourth link are attributes of being unavailable. n is an integer greater than or equal to 0, and j4 is an integer greater than or equal to 1.

The third processing unit 71 is configured to determine, by using the second mode, that attributes of the first i3 symbols in slot (n) of the third link and attributes of the last j4 symbols in slot (n−1) of the fourth link are attributes of being unavailable. n is an integer greater than or equal to 0, and i3 and j4 are each an integer greater than or equal to 1.

The default mode may be a mode specified in a protocol or may be understood as a mode determined by negotiation between the first node and the second node.

In this embodiment, the determination of the attribute of a symbol may be configured by the first node to the second node, that is, a third communication unit 72 of the second node receives the attribute of the symbol configured by the first node. As described in Table 1, the first node determines an unavailable symbol according to the content of the row corresponding to a default index (for example, index=0). The default index of the second node is the same as the default index (for example, index=0) of the first node. The second node determines an unavailable symbol according to the content of the row corresponding to the default index. The preferred value of j1 and the preferred value of i2 are each less than or equal to 30 symbols.

The third processing unit 71 is configured to use the symbol as a gap in the case where the symbol has the attribute of being unavailable.

The third processing unit 71 is configured to extend, based on a subcarrier spacing, the symbol having the attribute of being unavailable, where the subcarrier spacing is obtained by multiplying, by k, a subcarrier spacing corresponding to the symbol having the attribute of being unavailable. x symbols in the symbols obtained by the extension have attributes of being unavailable, and k−x symbols in the symbols obtained by the extension have attributes of being available. k is an integer greater than 1, and x is an integer greater than or equal to 1.

The third processing unit 71 is configured to round a time offset T_offset or T_delta according to a symbol boundary or a slot boundary in the case where uplink receive timing of the first node and uplink receive timing of the second node are not aligned with each other. Whether rounding up or rounding down is used may be selected depending on the actual situation. The details are not listed here.

The third processing unit 71 is configured to determine, based on a symbol having the attribute of being unavailable within a preset duration, start and end points of a symbol having the attribute of being available and the range of the symbol having the attribute of being available. That is, symbols other than symbols having the attribute of being unavailable within a preset duration are available symbols. That is, the start position and the end position of the available symbols can be determined based on the unavailable symbols. In this manner, the range of the symbols having the attribute of being available can be determined based on the start position and the end position.

Figure 28:
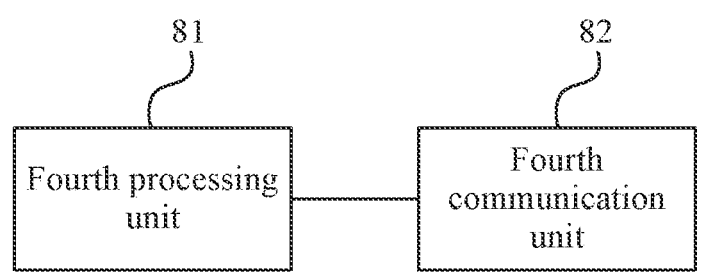
FIG. 28 is diagram four illustrating the structure of a node according to an embodiment of the present application.

In an example embodiment, a node is provided. As shown in FIG. 28, the node includes a fourth processing unit 81.

The fourth processing unit 81 is configured to determine the attribute of a symbol according to at least one parameter by using a second mode. The attribute includes the attribute of being unavailable or the attribute of being available. The second mode is a default mode or a mode configured by a first node.

The at least one parameter includes at least one of a propagation delay (PD); an equivalent time difference E_offset; a receive-transmit switching gap; a symbol duration T_symbol; or a transient period.

In this embodiment, definitions of the default mode, configured mode and links are the same as those described in the previous embodiment and thus are not repeated here.

In this embodiment, the step in which the attribute of a symbol is determined according to at least one parameter by using a second mode may be performed by using one of the processing modes below.

The fourth processing unit 81 is configured to, in the case where the PD is less than the gap, determine, by using the second mode, that attributes of the first i1 symbols in slot (n) of the first link and attributes of the last j1 symbols in slot (n+m) of the first link are attributes of being unavailable. n and m are each an integer greater than or equal to 0, and i1 and j1 are each an integer greater than or equal to 1.

The fourth processing unit 81 is configured to, in the case where the PD is less than the gap, determine, by using the second mode, that attributes of the last j2 symbols in slot (n−1) of the second link and attributes of the last j1 symbols in slot (n+m) of the first link are attributes of being unavailable. n and m are each an integer greater than or equal to 0, and j2 and j1 are each an integer greater than or equal to 1.

The fourth processing unit 81 is configured to, in the case inhere the PD is less than the gap, determine, by using the second mode, that attributes of the first i1 symbols in slot (n) of the first link and attributes of the first i2 symbols in slot (n+m+1) of the second link are attributes of being unavailable. n and m are each an integer greater than or equal to 0, and i1 and i2 are each an integer greater than or equal to 1.

The fourth processing unit 81 is configured to, in the case where the PD is less than the gap, determine, by using the second mode, that attributes of the last j2 symbols in slot (n−1) of the second link and attributes of the first i2 symbols in slat (n+m+1) of the second link are attributes of being unavailable. n and m are each an integer greater than or equal to 0, and j2 and i2 are each an integer greater than or equal to 1.

The fourth processing unit 81 is configured to, in the case where the PD is greater than the gap and less than the difference obtained by subtracting the gap from the T_symbol, determine, by using the second mode, that attributes of the last j1 symbols in slot (n+m) of the first link are attributes of being unavailable. n and m are each an integer greater than or equal to 0, and j1 is an integer greater than or equal to 1.

The fourth processing unit 81 is configured to, in the case where the PD is greater than the gap and less than the difference obtained by subtracting the gap from the T_symbol, determine, by using the second mode, that attributes of the first i2 symbols in slot (n+m+1) of the second link are attributes of being unavailable. n and m are each an integer greater than or equal to 0, and i2 is an integer greater than or equal to 1.

The fourth processing unit 81 is configured to, in the case where the PD is greater than the difference obtained by subtracting the gap from the T_symbol, determine, by using the second mode, that attributes of the last j1 symbols in slot (n+m) of the first link are attributes of being unavailable. n and m are each an integer greater than or equal to 0, and j1 is an integer greater than or equal to 1.

The fourth processing unit 81 is configured to, in the case where the PD is greater than the difference obtained by subtracting the gap from the T_symbol, it is determined, by using the second mode, that attributes of the first i2 symbols in slot (n+m+1) of the second link are attributes of being unavailable. n and m are each an integer greater than or equal to 0, and i2 is an integer greater than or equal to 1.

The fourth processing unit 81 is configured to, in the case where the PD is greater than the difference obtained by subtracting the gap from the T_symbol, determine, by using the second mode, that attributes of the last j1 symbols in slot (n) of the first link and attributes of the first i2 symbols in slot (n+m+1) of the second link are attributes of being unavailable. n and m are each an integer greater than or equal to 0, and j1 and i2 are each an integer greater than or equal to 1.

The fourth processing unit 81 is configured to, in the case where the PD is less than the gap, determine, by using the second mode, that attributes of the first i3 symbols in slot (n) of the third link and attributes of the last j3 symbols in slot (n+m) of the third link are attributes of being unavailable. n and m are each an integer greater than or equal to 0, and i3 and j3 are each an integer greater than or equal to 1.

The fourth processing unit 81 is configured to, in the case where the PD is less than the gap, determine, by using the second mode, that attributes of the last j4 symbols in slot (n−1) of the fourth link and attributes of the last j3 symbols in slot (n+m) of the third link are attributes of being unavailable. n and m are each an integer greater than or equal to 0, and j4 and j3 are each an integer greater than or equal to 1.

The fourth processing unit 81 is configured to, in the case where the PD is less than the gap, determine, by using the second mode, that attributes of the first i3 symbols in slot (n) of the third link and attributes of the first i4 symbols in slot (n+m+1) of the fourth link are attributes of being unavailable. n and m are each an integer greater than or equal to 0, and i3 and i4 are each an integer greater than or equal to 1.

The fourth processing unit 81 is configured to, in the case where the PD is less than the gap, determine, by using the second mode, that attributes of the last j4 symbols in slot (n−1) of the fourth link and attributes of the first i4 symbols in slot (n+m+1) of the fourth link are attributes of being unavailable. n and m are each an integer greater than or equal to 0, and j4 and i4 are each an integer greater than or equal to 1.

The fourth processing unit 81 is configured to, in the case where the PD is greater than the gap and less than the difference obtained by subtracting the gap from the T_symbol, determine, by using the second mode, that attributes of the first i3 symbols in slot (n) of the third link are attributes of being unavailable. n is an integer greater than or equal to 0, and i3 is an integer greater than or equal to 1.

The fourth processing unit 81 is configured to, in the case where the PD is greater than the gap and less than the difference obtained by subtracting the gap from the T_symbol, determine, by using the second mode, that attributes of the last j4 symbols in slot (n−1) of the fourth link are attributes of being unavailable. n is an integer greater than or equal to 0, and j4 is an integer greater than or equal to 1.

The fourth processing unit 81 is configured to, in the case where the PD is greater than the difference obtained by subtracting the gap from the T_symbol, determine, by using the second mode, that attributes of the first i3 symbols in slot (n) of the third link are attributes of being unavailable. n is an integer greater than or equal to 0, and i3 is an integer greater than or equal to 1.

The fourth processing unit 81 is configured to, in the case where the PD is greater than the difference obtained by subtracting the gap from the T_symbol, determine, by using the second mode, that attributes of the last j4 symbols in slot (n−1) of the fourth link are attributes of being unavailable. n is an integer greater than or equal to 0, and j4 is an integer greater than or equal to 1.

The fourth processing unit 81 is configured to, in the case where the PD is greater than the difference obtained by subtracting the gap from the T_symbol, determine, by using the second mode, that attributes of the first i3 symbols in slot (n) of the third link and attributes of the last j4 symbols in slot (n−1) of the fourth link are attributes of being unavailable. n is an integer greater than or equal to 0, and i3 and j4 are each an integer greater than or equal to 1.

Different from the previous embodiment, this embodiment further includes determining a PD or an E_offset. In the examples described later, the first node is a parent node, and the second node is a child node.

The fourth processing unit 81 is configured to, in the case where a first condition is satisfied, calculate the PD or the E_offset of the second node based on a TA and a T_offset or based on the TA and a T_delta.

The first condition is one of the conditions below.

The first node has no external synchronization source, and the second node has no external synchronization source; the first node has no external synchronization source, and the second node has an external synchronization source; the first node has an external synchronization source, and the second node has an external synchronization source; or the first node has an external synchronization source, and the second node has no external synchronization source.

The fourth processing unit 81 is configured to, in the case where the first node has an external synchronization source and the second node has an external synchronization source, calculate the PD based on a DRT and a DTT, and a fourth communication unit 82 of the second node sends the PD or the E_offset to the first node. Here the DRT is the DRT of the second node, and the DTT is the DTT of the second node obtained by the second node according to the GNSS.

The fourth processing unit 81 is configured to, in the case where the first node has an external synchronization source and the second node has an external synchronization source, calculate the PD or the E_offset of the second node based on a DRT and a DTT2. Here the DRT is the DRT of the second node, and the DTT2 is the DTT of the second node obtained by the second node according to the GNSS.

The fourth processing unit 81 is configured to, in the case where the first node has no external synchronization source and the second node has no external synchronization source, calculate the PD or the E_offset based on DRT and DTT, and the fourth communication unit 82 reports at least one of the following to the first node: attributes of the first i symbols in slot (n) of the first or third link; or attributes of the last j symbols in the slot (n) of the first or third link. n is an integer greater than or equal to 0, and i and j are each an integer greater than or equal to 0.

Functions of units of a node are processed in the same manner as functions in the previous methods and thus are not repeated here.

With the preceding implementations, the attribute of a symbol, including the attribute of being unavailable or the attribute of being available, can be determined: In this manner, by default or configuration, it is possible for both the first node and the second node to learn about attributes corresponding symbols, that is, learn which symbols are available or which symbols are unavailable.

Figure 29:
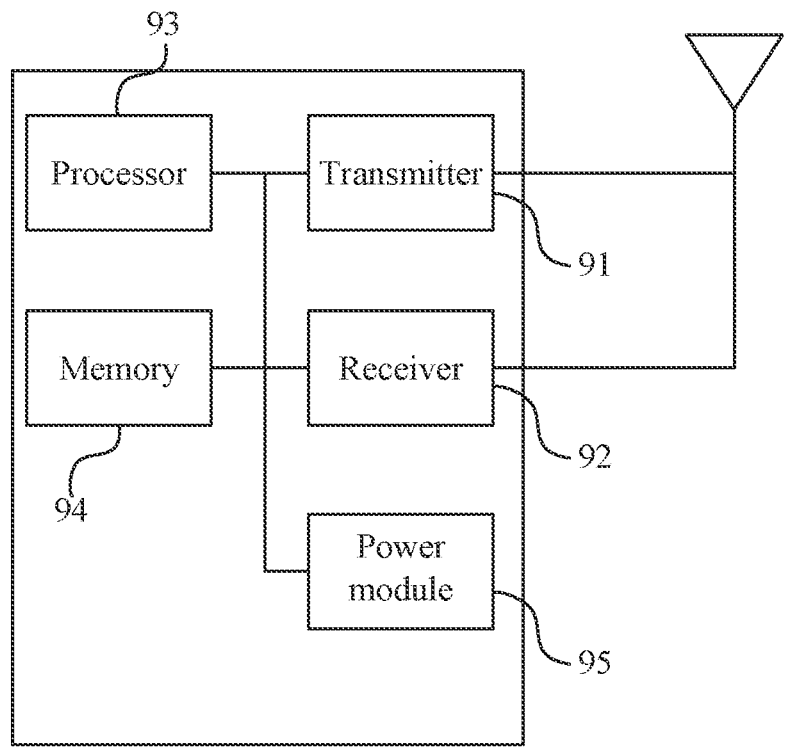
FIG. 29 is diagram one illustrating the structure of the hardware of a node according to an embodiment of the present application.
Figure 30:
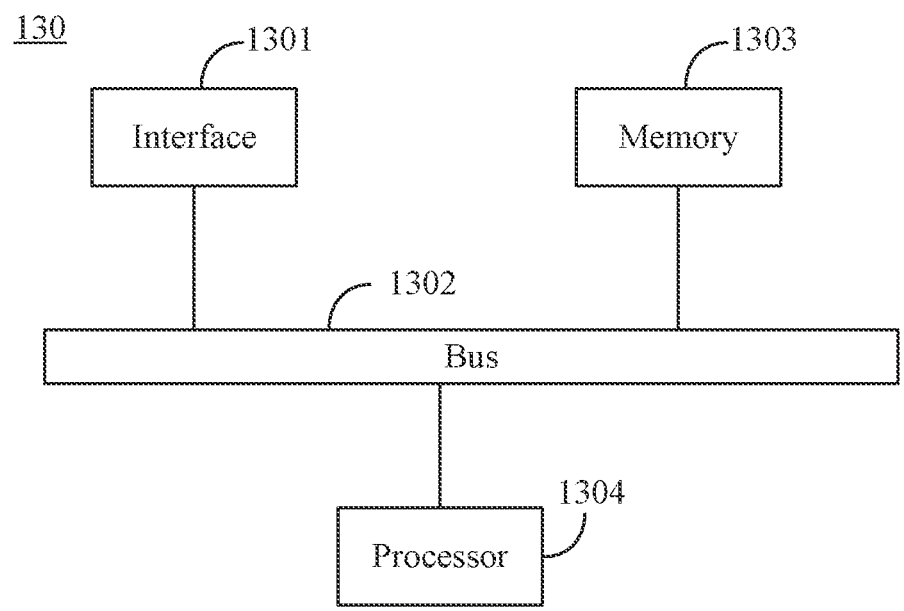
FIG. 30 is diagram two illustrating the structure of the hardware of a node according to an embodiment of the present application.

FIG. 29 is diagram one illustrating the structure of the hardware of a node according to an embodiment of the present application. The hardware of the node includes a transmitter 91, a receiver 92, a power module 95, a memory 94 and a processor 93. The receiver may be the preceding information receiving unit. The processor may include the preceding information extraction unit and the preceding information processing unit. FIG. 30 is diagram two illustrating the structure of the hardware of a node according to an embodiment of the present application. As shown in the figure, the node 130 according to this embodiment of the present application includes a memory 1303 and a processor 1304. The terminal device 130 may further include an interface 1301 and a bus 1302. The interface 1301, the memory 1303 and the processor 1304 are connected to each other by the bus 1302. The memory 1303 is configured to store instructions. The processor 1304 is configured to read the instructions to execute the technical solution of any preceding method embodiment applied to the terminal device. The implementation principles and technical effects are similar. The details are not repeated here.

Figure 31:
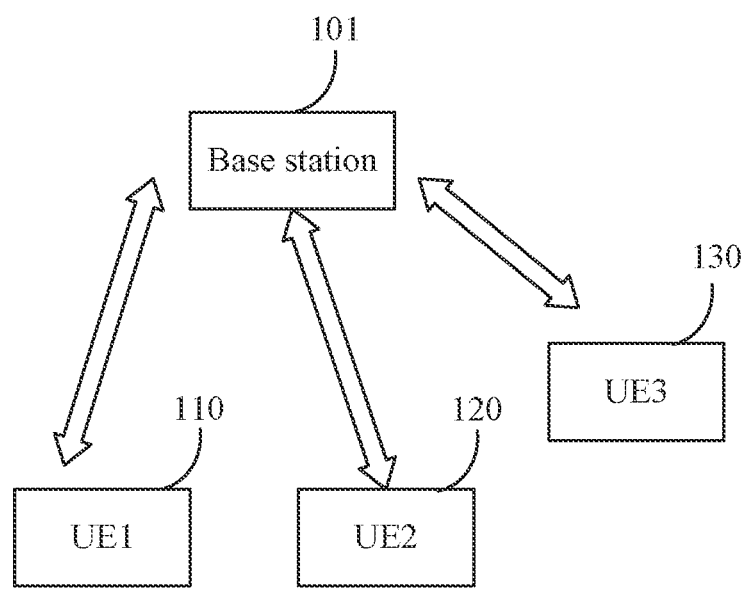
FIG. 31 is a diagram illustrating the structure of a communication system according to an embodiment of the present application.

FIG. 31 is a diagram illustrating the structure of a communication system according to an embodiment of the present application. A description is given in this embodiment by using an example in which the network device is a base station 101 and the terminal device is a UE 110, 120 or 130. Functions of the preceding base station and the preceding UE are the same as those in the previous embodiments and thus are not repeated here.

The preceding are merely example embodiments of the present application and are not intended to limit the scope of the present application.

The term user terminal encompasses any appropriate type of radio user device, such as a mobile phone, a portable data processing apparatus, a portable web browser or a vehicle-mounted mobile station.

In general, embodiments of the present application may be implemented in hardware or dedicated circuits, software, logic or any combination thereof. For example, some aspects may be implemented in hardware while other aspects may be implemented in firmware or software that may be executed by a controller, a microprocessor or other computing apparatuses, although the present application is not limited thereto.

Embodiments of the present application may be implemented by computer program instructions executed by a data processor of a mobile apparatus, for example, in a processor entity, may be implemented by hardware or may be implemented by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in drawings of the present application may represent program steps, may represent interconnected logic circuits, modules and functions or may represent a combination of program steps, logic circuits, modules and functions. The computer program may be stored in a memory. The memory may be of any type suitable for a local technical environment and may be implemented using any suitable data storage technology. The memory in embodiments of the present application may be a volatile memory or a non-volatile memory or may include both a volatile memory and a. non-volatile memory. The non-volatile memory may be a read-only memory (ROM), a programmable ROM (PROM), an erasable PROM (EPROM), an electrically EPROM (EEPROM) or a flash memory. The volatile memory may be a random-access memory (RAM) and serves as an external cache. Many forms of RAMs may be used, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SL-DRAM) and a direct rambus RAM (DRRAM). The memory of the system and the method described in the present application includes, but is not limited to, these and any other suitable type of memory.

The processor of embodiments of the present application may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA) or any other programmable logic device, a discrete gate or transistor logic device, a discrete hardware component, or a processor based on a multi-core processor architecture. The general-purpose processor may be, for example, a microprocessor or any commonly used processor. The preceding processor may implement or execute steps of the methods disclosed in embodiments of the present application. Software modules may be located in a random-access memory, a flash memory, a read-only memory, a programmable read-only memory, an electrically erasable programmable read-only memory, a register, or any other established storage medium in the art. The storage medium is located in the memory. The processor may read information in the memory and implement the steps of the preceding methods in combination with the hardware.

What is claimed is:

1. A symbol attribute determination method, the method being applied to a first node and comprising:
   determining an attribute of a symbol by using a first mode, wherein the attribute comprises an attribute of being unavailable or an attribute of being available, and the first mode is a default mode or a configured mode;

wherein determining the attribute of the symbol comprising:

in response to a symbol of a first link being used to convert from downlink transmission to downlink reception of a second node, determining that the symbol of the first link has an attribute of being unavailable, wherein the first link is a link for data transmission from the first node to the second node;

in response to another symbol of the first link being used to convert from downlink reception to downlink transmission of the second node, determining that the another symbol of the first link has an attribute of being unavailable;

in response to a symbol of a second link being used to convert from uplink transmission to uplink reception of the second node, determining that the symbol of the second link has an attribute of being unavailable, wherein the second link is a link for data transmission from the second node to the first node; and in response to another symbol of the second link being used to convert from uplink reception to uplink transmission of the second node, determining that the another symbol of the second link has an attribute of being unavailable.

2. The method of claim 1, wherein a number of the symbol of the first link having the attribute of being unavailable is an integer greater than or equal to 0;

a number of the another symbol of the first link having the attribute of being unavailable is an integer greater than or equal to 0;

a number of the symbol of the second link having the attribute of being unavailable is an integer greater than or equal to 0; and a number of the another symbol of the second link having the attribute of being unavailable is an integer greater than or equal to 0.

3. The method of claim 1, further comprising:

using the symbol and the another symbol of the first link having the attribute of being unavailable as gaps and using the symbol and the another symbol of the second link having the attribute of being unavailable as gaps.

4. The method of claim 1, further comprising:

determining, based on the symbol and the another symbol of the first link having the attribute of being unavailable within a preset duration, start and end points of at least one symbol of the first link having the attribute of being available and a range of the at least one symbol of the first link having the attribute of being available.

5. The method of claim 1, further comprising:

configuring the attribute of the symbol onto the second node.

6. A first node, comprising a processor and a memory, wherein the memory is configured to store a computer program, and the processor is configured to invoke and execute the computer program stored in the memory to perform the symbol attribute determination method according to claim 1.

7. A non-transitory storage medium storing a computer program which, when executed by a processor, causes the processor to perform the symbol attribute determination method according to claim 1.

8. A symbol attribute determination method, the method being applied to a first node and comprising:

determining an attribute of a symbol by using a second mode, wherein the attribute comprises an attribute of being unavailable or an attribute of being available, and the second mode is a default mode or a mode configured by a second node;

wherein determining the attribute of the symbol comprising:

in response to a symbol of a first link being used to convert from downlink transmission to downlink reception of the first node, determining that the symbol of the first link has an attribute of being unavailable, wherein the first link is a link for data transmission from the second node to the first node;

in response to another symbol of the first link being used to convert from downlink reception to downlink transmission of the first node, determining that the another symbol of the first link has an attribute of being unavailable;

in response to a symbol of a second link being used to convert from uplink transmission to uplink reception of the first node, determining that the symbol of the second link has an attribute of being unavailable, wherein the second link is a link for data transmission from the first node to the second node; and in response to another symbol of the second link being used to convert from uplink reception to uplink transmission of the first node, determining that the another symbol of the second link has an attribute of being unavailable.

9. The method of claim 8, wherein, a number of the symbol of the first link having the attribute of being unavailable is an integer greater than or equal to 0;

a number of the another symbol of the first link having the attribute of being unavailable is an integer greater than or equal to 0;

a number of the symbol of the second link having the attribute of being unavailable is an integer greater than or equal to 0; and a number of the another symbol of the second link having the attribute of being unavailable is an integer greater than or equal to 0.

10. A first node, comprising a processor and a memory, wherein the memory is configured to store a computer program, and the processor is configured to invoke and execute the computer program stored in the memory to perform a step in the following unit:

a third processing unit configured to determine an attribute of a symbol by using a second mode, wherein the attribute comprises an attribute of being unavailable or an attribute of being available, and the second mode is a default mode or a mode configured by a second node;

wherein determining the attribute of the symbol comprising:

in response to a symbol of a first link being used to convert from downlink transmission to downlink reception of the first node, determining that the symbol of the first link has an attribute of being unavailable, wherein the first link is a link for data transmission from the second node to the first node;

in response to another symbol of the first link being used to convert from downlink reception to downlink transmission of the first node, determining that the another symbol of the first link has an attribute of being unavailable;

in response to a symbol of a second link being used to convert from uplink transmission to uplink reception of the first node, determining that the symbol of the second link has an attribute of being unavailable, wherein the second link is a link for data transmission from the first node to the second node; and in response to another symbol of the second link being used to convert from uplink reception to uplink transmission of the first node, determining that the another symbol of the second link has an attribute of being unavailable.

\* \* \* \* \*